United States Patent [19]
Nakanishi et al.

[11] Patent Number: 5,953,307
[45] Date of Patent: Sep. 14, 1999

[54] DISK REPRODUCING APPARATUS FOR STORING A PLURALITY OF CARTRIDGES

[75] Inventors: Yasuyuki Nakanishi; Koutarou Oka; Kei Shirahata; Shigehiro Itou; Tatsunori Fujiwara, all of Hyogo, Japan

[73] Assignee: Mitsubishi Denki Kabushiki Kaisha, Tokyo, Japan

[21] Appl. No.: 08/779,669

[22] Filed: Jan. 7, 1997

Related U.S. Application Data

[63] Continuation of application No. 08/321,607, Oct. 12, 1994, abandoned.

[30] Foreign Application Priority Data

Nov. 1, 1993 [JP] Japan ................................. 5-273594
Jan. 12, 1994 [JP] Japan ................................. 6-001624

[51] Int. Cl.$^6$ ........................... G11B 17/04; G11B 15/68
[52] U.S. Cl. ............................................. 369/192; 360/92
[58] Field of Search .................................. 360/92, 99.02, 360/99.03, 99.06, 99.07; 369/192, 34, 77.2, 75.2, 178, 191

[56] References Cited

U.S. PATENT DOCUMENTS

| | | | |
|---|---|---|---|
| 4,471,394 | 9/1984 | Hapke | 360/92 |
| 5,006,940 | 4/1991 | Hamachi et al. | 360/92 |
| 5,123,001 | 6/1992 | Nakamichi et al. | 369/38 |
| 5,157,564 | 10/1992 | Theobald et al. | 360/92 |
| 5,210,728 | 5/1993 | Noguchi et al. | 369/38 |
| 5,247,500 | 9/1993 | Miyoshi et al. | 369/192 |
| 5,493,556 | 2/1996 | Aoki et al. | 360/98.04 |

*Primary Examiner*—Robert S. Tupper
*Assistant Examiner*—David D. Davis

[57] ABSTRACT

A MD loading mechanism for a multidisk MD reproducing apparatus capable of storing a plurality of MDs and of reproducing information recorded on the plurality of MDs successively comprises: a plurality of cartridge holders for holding MD cartridges therein, respectively; a MD cartridge storage unit for storing the plurality of cartridge holders therein in a stack so that the back end surfaces of the MD cartridges held within the cartridge holders can be seen from outside, provided with a plurality of insertion slots through which the MD cartridges are inserted in the cartridge holders and cartridge holder locking means for locking the cartridge holders within the MD cartridge storage unit; and a cartridge holder transfer means for transferring the cartridge holder holding a desired MD cartridge from the MD cartridge storage unit to the MD reproducing apparatus. The contents of the MD cartridges stored in the MD cartridge storage unit can be known and the MD cartridges can be taken out or changed while the MD reproducing apparatus is in operation.

10 Claims, 28 Drawing Sheets

DISK REPRODUCING APPARATUS FOR STORING A PLURALITY OF CARTRIDGES

This application is a continuation of application Ser. No. 08/321,607 filed on Oct. 12, 1994, now abandoned.

BACKGROUND OF THE INVENTION

1. Field of the Invention

This invention relates to a disk reproducing apparatus and, more specifically, to a minidisk loading mechanism for a multiple disk reproducing apparatus capable of storing a plurality of minidisks, i.e., the so-called MDs, for continuous reproducing operation.

2. Description of the Prior Art

A disk reproducing apparatus, similarly to a disk recording apparatus, is provided with a multidisk loading mechanism capable of storing a plurality disks, of automatically taking out the disks in a predetermined order, loading the disk into a reproducing unit, and returning the disk from the reproducing unit to its storage position after the information recorded on the disk has been reproduced.

Since a multidisk loading mechanism designed specially for a minidisk reproducing apparatus has not generally been known, a CD apparatus, which is similar to a minidisk reproducing apparatus, will be described.

FIG. 38 shows a disk loading mechanism analogous with a known multidisk loading mechanism disclosed in Japanese Utility Model Laid-open (Kokai) No. 4-20674. Shown in FIG. 38 are a frame 1, a pivotal shaft 2, a CD reproducing apparatus 3, a plurality of CD holders 4, a pivotal pin 5, a recess 6 formed in each CD holder 4.

The operation of the multidisk loading mechanism shown in FIG. 38 will be described with reference to FIGS. 39 and 40. Each CD holder 4 having the shape of a case holds a CD (compact disk) 7 therein. The plurality of CD holders 4 are supported for turning relative to the frame 1 on the pivotal pin 5. The frame 1 is able to turn on the pivotal shaft 2. The frame 1 is turned on the pivotal shaft 2 in the direction of the arrow (FIG. 39) to take out the frame 1 holding the CD holders 4 from the CD reproducing apparatus 3. In this state, the CDs 7 can be taken out from and put into the CD holders 4.

When playing the CDs 7, the frame 1 is turned to a loading position 26 (FIG. 40) outside the CD reproducing apparatus 3 as shown in FIG. 39, the CDs 7 are inserted in the CD holders 4, respectively, and then the frame 1 is turned to a standby position 27 (FIG. 40) inside the CD reproducing apparatus 3 as shown in FIG. 38. Then, a piece of music is specified by operating a selector key, not shown, to make a control circuit, not shown, select the specified piece of music. Then, the CD holder 4 holding the CD 7 storing the specified piece of music is turned on the pivotal pin 5 to a reproducing position 28 (FIG. 40). During the operation of the CD reproducing apparatus 3, all the CDs 7 are held at the standby position 27 inside the CD reproducing apparatus 3 and covered with the frame 1 to protect the CDs 7 from dust. In this state, however, the CDs 7 are hidden from view.

Referring to FIG. 40, a signal converting head (hereinafter referred to as "sensor") for reading information from and writing information on the CDs 7 moves along an alternate long and short dash line. When the CD reproducing apparatus 3 is installed with a plane in which the CD holder 4 is moved in a vertical position, the sensor moves vertically. When the CD reproducing apparatus 3 is installed with the plane in which the CD holder 4 is moved in a horizontal position, the sensor moves horizontally. However, since the sensor is comparatively heavy, facility in moving the sensor affecting reproducing performance is greatly dependent on the position in which the CD reproducing apparatus 3 is installed. A minidisk reproducing apparatus is similar in construction as the CD reproducing apparatus 3, except that the minidisk reproducing apparatus is constructed so as to use minidisks contained in cartridges.

The construction of a minidisk cartridge will be described to facilitate understanding the present invention. FIG. 41 is a perspective view of the front side of a minidisk cartridge disclosed in Japanese Patent Laid-open (Kokai) No. 4-278269, and FIG. 42 is a perspective view of the back side of the same minidisk cartridge. Referring to FIGS. 41 and 42, a minidisk cartridge (hereinafter referred to simply as "cartridge") 25 has a flat case 13 containing a disk 16, a shutter 14 put on the case 13 for sliding movement in the direction of the arrow (FIG. 41) to open an opening through which access to the disk 16 can be gained, and a key 15 provided on the case 13 to lock the shutter 14 at the closed position. When one end of the key 15 disposed within a groove 17 formed in a side wall of the case 13 is depressed, the key 15 releases the shutter 14 to enable the shutter 14 to be moved in the direction of the arrow.

An opening 18 is formed in the central area of the back wall of the case 13 and a center plate 19 fastened to the disk 16 is exposed in the opening 18. A plurality of holes 20 and recesses 22 for positioning the case 13 and transferring the cartridge 25 are formed in the back wall of the case 13. A mark 21 indicating the direction of insertion of the cartridge 25 is formed near one side of the case 13 on the back surface of the case 13. Corners at the opposite ends of the side near the mark 21 are rounded. The cartridge 25 is inserted in a reproducing apparatus, not shown, in the direction indicated by the mark 21.

Referring to FIG. 43 showing the back end surface 24 of the case 13 of the cartridge 25, a label having the description of the contents, such as titles of pieces of music, name of data, title or the like, of the disk 16 contained in the case 13 is attached to the outer surface of the back end surface 24 of the case 13. Since other side walls are used for functional purposes, the label 13 is not allowed to be attached to the side walls other than the back end surface 24.

Referring to FIGS. 44, 45 and 46 showing a disk loading unit included in a CD reproducing apparatus disclosed in Japanese Utility Model 62-63853, there are shown a disk 7, a magnetic turntable 62 on which the disk 7 is supported and held in place magnetically, a floating deck 60 supporting the turntable 62 for rotation, a base plate 59, damping supports 64 supporting the floating deck 60 in a floating state on the base plate 59, locking pins 65 projecting from the opposite sides of the front and back ends of the floating deck 60, and locking plates 67 that engage the locking pins 65 to fix the floating deck 60 relative to the base plate 59 when mounting the disk 7 on the magnetic turntable 62. A disk mounting mechanism, not shown, for mounting the disk 7 on the magnetic turntable 62 is disposed over the floating deck 60 lowers the disk 7 from a position at a height A toward the magnetic turntable 62 so that the disk mounting mechanism and the magnetic turntable 62 supported on the base plate 59 will not interfere with each other when the disk mounting mechanism locates the disk 7 above the magnetic turntable 62.

Since the position of an optical pickup head, not shown, must precisely be controlled when reading information from the disk 7 with the optical pickup head, the floating deck 60 holding the optical pickup head and a disk driving motor, not shown, is supported in a floating state on the base plate 59 by the damping supports 64 to avoid the adverse influence of disturbing external vibrations on the reading operation of the optical pickup head. Therefore, when mounting the disk 7 on the magnetic turntable 62, the locking plates 67 are brought into engagement with the locking pins 65 to lock the floating deck 60 holding the magnetic turntable 62 in place because the disk 7 cannot correctly be mounted on the magnetic turntable 62 if the turntable is unstable, and then the disk 7 is lowered toward and mounted on the magnetic turntable 62. The disk mounting mechanism lowers the disk 7 from a position at the height A higher than a height B at which the disk 7 is seated on the magnetic turntable 62 by a height difference C necessary for preventing the interference between the disk 7 and the magnetic turntable 62.

The disk loading mechanism thus constructed of the conventional multidisk reproducing apparatus has the following problems.

1) It is impossible to find visually which CD holders are empty and which CD holders are loaded with CDs while the multidisk reproducing apparatus is in operation.

2) The contents of the CDs stored in the CD holders at the standby position cannot be read.

3) The CDs stored in the CD holders cannot be taken out or changed while the multidisk reproducing apparatus is in operation.

4) The frame 1 must have a strong construction because the frame 1 moves all the CDs together and hence the disk loading mechanism is comparatively heavy.

5) Since the CD holders are supported by the pivotal pin 5 on the frame 1 in a cantilever fashion, the pivotal pin 5 must be comparatively long to support the CD holders so that the CD holders will not decline and, consequently, the thickness of the stack of the CD holders is large as compared with the thickness of the plurality of CDs.

6) Since the sensor for reading information from the CD of the multidisk reproducing apparatus moves straight relative to the front side of the multidisk reproducing apparatus, the direction of the gravitational acceleration acting on the sensor changes when the position of the multidisk reproducing apparatus is changed and hence the multidisk reproducing apparatus must be installed in a specified position.

7) Since the locking plates 67 engage the locking pins 65 with the floating deck 60 supported at its original position by the damping supports 64, the disk must be inserted into the disk loading mechanism at a position above the magnetic turntable 62 and lowered toward the magnetic turntable 62, which inevitably increases the size of the CD reproducing apparatus.

8) Since the floating deck moves vertically within the range of stroke of the damping supports 64, additional spaces must be secured above and under the cartridge, which increases the size of the CD reproducing apparatus.

9) Since the thickness of the CD reproducing apparatus is dependent on the range of vertical movement of the elevator, the size of the CD reproducing apparatus is increased if the thickness of the elevator driving unit is added to the range of vertical movement of the elevator.

10) Although the stopping position of the elevator must accurately correspond to the height of the cartridge, the stopping position often deviates from the correct position due to the inertia of the driving mechanism or external vibrations.

SUMMARY OF THE INVENTION

Minidisk cartridge loading mechanisms (MD cartridge loading mechanism) in a first to a seventh aspect of the present invention are intended to solve the problems 1) to 5), and it is therefore an object of the same to provide MD cartridge loading mechanisms that enable the observaion and identification of MDs stored therein other than a MD loaded on the MD reproducing apparatus, enable the stored MDs to be taken out and changed, have a compact, light-weight construction, and enable the MD reproducing apparatus to be constructed in a comparatively small thickness.

The MD cartridge loading mechanism in the seventh aspect of the present invention are intended to solve the problem 6), and it is therefore an object of the seventh aspect of the present invention to provide a MD cartridge loading mechanism that does not place any restrictions on the position of the MD reproducing apparatus.

A MD cartridge loading mechanism in an eighth aspect of the present invention is intended to solve the problem 5).

MD cartridge loading mechanisms in a ninth to an eleventh aspect of the present invention have been formed by incorporating improvements into the MD cartridge loading mechanisms in the first to the seventh aspect of the present invention.

A cartridge transfer mechanism in a twelfth aspect of the present invention for a MD cartridge loading mechanism is intended to solve the problem 7), and it is therefore an object of the twelfth aspect of the present invention to provide a cartridge transfer mechanism for a MD cartridge loading mechanism, capable of transferring a MD in a plane on a level (height) equal to a level (height) on which the MD is disposed for reproducing operation without entailing interference between the MD and the turntable, and of enabling the MD reproducing apparatus to be formed in a construction having a comparatively small thickness.

A cartridge transfer mechanism in a thirteenth and a seventeenth aspect of the present invention is intended to solve the problem 8), and it is therefore an object of the thirteenth and the seventeenth aspect of the present invention to provide a cartridge transfer mechanism for a small MD cartridge loading mechanism that does not require any spaces above and under the level on which and MD is inserted into the MD reproducing apparatus.

Fourteenth, fifteenth and sixteenth aspects of the present invention are intended to solve the problem 9), and it is therefore an object of the fourteenth, fifteenth and sixteenth aspect of the present invention to enable the determination of the height of the MD reproducing apparatus without being affected by the elevator driving mechanism.

An eighteenth aspect of the present invention is intended to solve the problem 10).

A MD cartridge loading mechanism in the first aspect of the present invention is provided with a plurality of cartridge insertion slots respectively for a plurality of cartridges, cartridge holders for holding the cartridges inserted therein so that the back end surfaces of the cartridges can be seen through the slots, a cartridge holder storage unit, and a cartridge holder transfer means for transferring a cartridge holder holding a cartridge containng a MD from which information is to be reproduced from the cartridge holder storage unit to a reproducing position.

A MD cartridge loading mechanism in the second aspect of the present invention is provided with a linear cartridge holder transfer means instead of the cartridge holder transfer means of the MD cartridge loading mechanism in the first aspect of the present invention.

A MD cartridge loading mechanism in the fourth aspect of the present invention is provided with an orthogonal cartridge holder transfer means instead of the cartridge holder transfer means of the MD cartridge loading mechanism in the first aspect of the present invention.

MD cartridge loading mechanisms in the third and the fifth aspect of the present invention are provided each with a double-insertion inhibiting plate at each cartridge insertion slot in addition to the means included in the MD cartridge loading mechanisms in the second aspect and the fourth aspect of the present invention.

A MD cartridge loading mechanism in the sixth aspect of the present invention is provided with cartridge holders each provided with a pivot in one corner thereof and a holding pin in another corner thereof instead of the cartridge holders of the MD cartridge loading mechanism in the first aspect of the present invention, and a circular cartridge holder transfer means for supporting each cartridge holder for turning at the holding pin thereof.

A MD cartridge loading mechanism in the seventh aspect of the present invention is provided, instead of the circular cartridge holder transfer means of the MD cartridge loading mechanism in the sixth aspect of the present invention, with an oblique circular cartridge holder transfermeans, and the sensor for reproducing information recorded on a MD moves in an angular position inclined at an angle of 45°, 135°, 225° or 315° relative to the front surface of the MD reproducing apparatus.

A MD cartridge loading mechanism in the eighth aspect of the present invention is provided with cartridge holders each having the shape of a U-shaped frame having neither a top wall or a bottom wall.

MD cartridge loading mechanisms in the ninth to the eleventh aspect of the present invention are provided, in addition to the means included in the MD cartridge loading mechanisms in the first to the seventh aspect of the present invention, with a guide panel provided with a recess.

A cartridge transfer means in the twelfth aspect of the present invention is provided with a floating deck locking means for moving the floating deck away from a cartridge being transferred and for locking the floating deck when transferring the cartridge holder from a standby position to the floating deck by a cartridge holder transfer means.

A cartridge transfer means in the thirteenth aspect of the present invention is provided with a vertical elevator driving means for shifting the reference pin of the floating deck to a level corresponding to the height of a transferred cartridge holder, and an elevator retracting means for retracting the elevator from a position at which the cartridge is supported on the elevator to a position near the inner cartridge after the elevator has been stopped at a height corresponding to an endmost cartridge holder by the vertical elevator driving means and the cartridge has been transferred to the floating deck.

A cartridge transfer means in the fourteenth aspect of the present invention is provided, in the means included in the thirteenth aspect of the present invention, with a step plate for driving the elevator for vertical movement, and a step plate driving system disposed outside the extension of a path along which the elevator is moved vertically.

In the fifteenth aspect of the present invention, damping members or low-friction members are attached to the opposite surfaces of the step plate and the frame.

In the sixteenth aspect of the present invention, the step plate is provided with a plurality of recesses, the frame is provided with a fixed projection or a plate spring, and the fixed projection or the plate spring engages the recesses when the elevator is stopped at a plurality of positions, respectively.

In the seventeenth aspect of the present invention, the step plate of the elevator retracting means in the thirteenth aspect of the present invention is provided with inclined cam slots each provided with stepped portions each having a triangular cam surface.

In the eighteenth aspect of the present invention, the plate cam of the step plate is provided with a protrusion.

As is apparent from the foregoing description, the present invention has the following advantages.

Since the cartridge holders of each of the MD cartridge loading mechanisms in the first to the seventeenth aspect of the present invention do not cover the back end surfaces of the cartridges so that titles of the contents of the cartridges marked on the back end surfaces of the cartridges are exposed, and the cartridge holder storage unit holds the cartridge holders at the standby position, the rear end surfaces of the cartridges held in the cartridge holders can be seen from outside through the cartridge insertion slots.

Since the cartridge holder transfer means, the linear cartridge holder transfer means, the circular cartridge holder transfer means or the oblique circular cartridge holder transfer means transfers only one of the cartridge holders holding the cartridge holders containing MDs from the standby position to the reproducing position, the rest of the cartridges held at the standby position can be taken out or changed while the MD reproducing apparatus is in operation.

Since each of the cartridge holders in the sixth and the seventh aspect of the present invention is supported at opposite sides thereof during transfer and is not supported in a cantilever fashion during turning, the mechanism for supporting the cartridge holder may be of a small construction.

Since the MD cartridge loading mechanism in the seventh aspect of the present invention disposes the cartridge in a position that makes the sensor move at an angle of 45° to the front surface of the MD reproducing apparatus, the MD reproducing apparatus may be installed in either a longitudinal position or a transverse position.

Since each of the cartridge holders in the eighth aspect of the present invention does not have any member corresponding to a top plate or a bottom plate, the MD reproducing apparatus can be formed in a construction having a very small thickness.

Each of the guide plates in the ninth to the eleventh aspect of the present invention facilitates the insertion of the cartridge therein.

Since the floating deck locking means in the twelfth aspect of the present invention moves the floating deck from the position where the floating deck is supported by the damping supports in a direction away from the turntable and locks the floating deck, the cartridge insertion position need not be raised when transferring the cartridge onto the turntable and hence the size of the MD reproducing apparatus can be reduced accordingly.

Since the elevator retracting means of the cartridge transfer mechanism in the thirteenth aspect of the present invention is provided with the elevator that moves downward after being loaded with the top cartridge among the stacked cartridges, the cartridge transfer mechanism can be formed in a small construction.

Since the step plate driving mechanism in the fourteenth aspect of the present invention is disposed outside the extension of the path of the vertical movement of the elevator driven by the step plate, the height of the MD reproducing apparatus is dependent only on the renge of vertical movement of the elevator, is not dependent on the height of the elevator driving system and hence the MD reproducing apparatus can be formed in a comparatively small construction.

Since the step plate and the frame in the fifteenth aspect of the present invention are provided with the damping members or the low-friction members on the surfaces thereof facing each other, the step plate and the elevator will not play, comparatively small damping supports may be employed for supporting the floating deck and hence the MD reproducing apparatus can be formed in a comparatively small construction.

Since the step plate in the sixteenth aspect of the present invention can be stopped exactly at the predetermined position by the engagement of the projection formed on the frame or the plate spring attached to the frame, and the recess formed in the step plate, the gradient of the cam of the step plate may be comparatively large, the step plate may be comparatively small and hence the MD reproducing apparatus can be formed in a comparatively small construction.

Since the elevator retracting means of the cartridge transfer mechanism in the seventeenth aspect of the present invention is capable of a function, in addition to that of the same in the thirteenth aspect of the present invention, to retract the elevator by the cam having an appropriate shape for retracting the elevator without requiring any special mechanism for retracting the elevator, the MD reproducing apparatus can be formed in a comparatively small construction.

The protrusion of the cam of the eighteenth aspect of the present invention prevents the dislocation of the step plate from its correct stopping position and hence the step plate can be stopped at its stopping position in a high accuracy.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
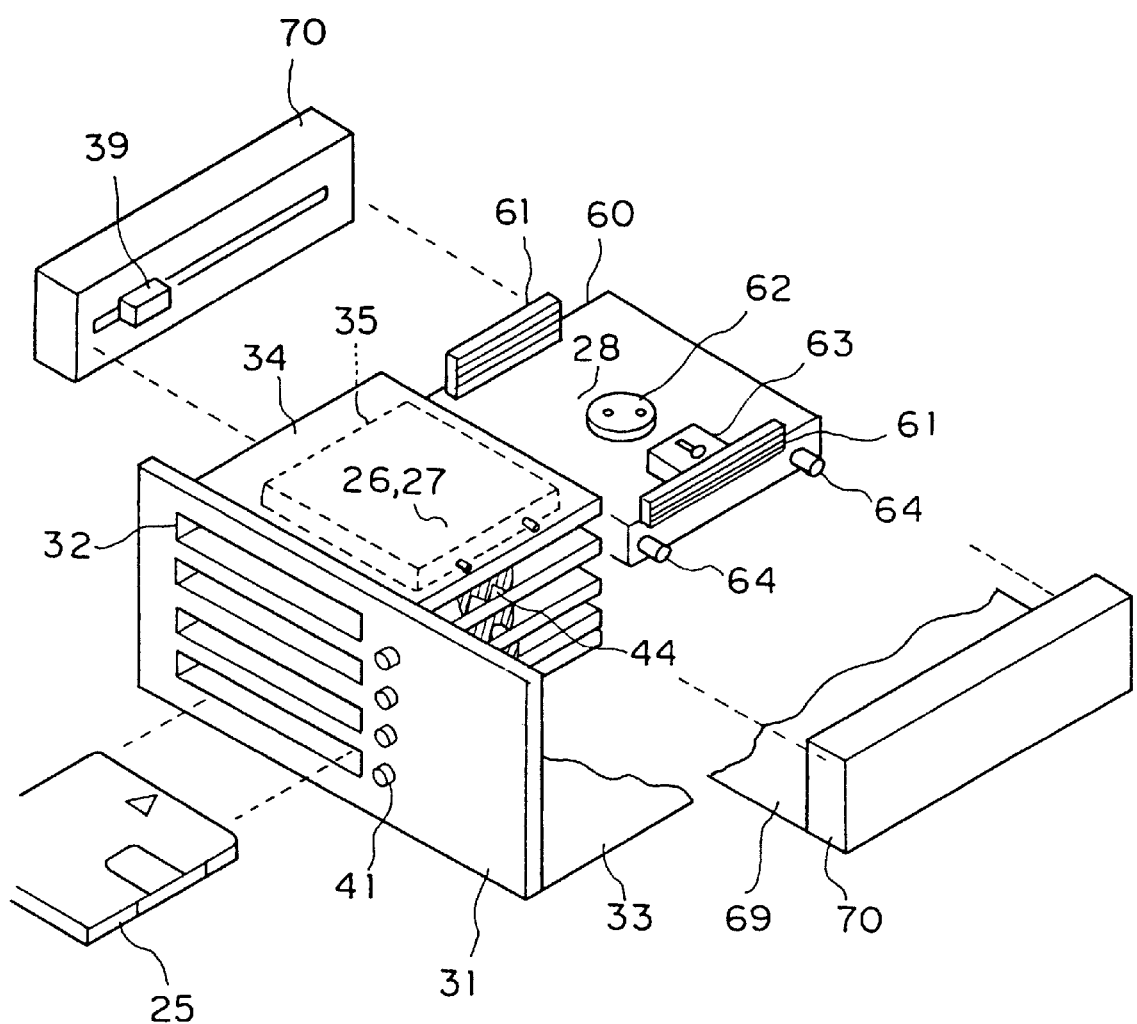
FIG. 1 is an exploded perspective view of a MD cartridge loading mechanism in a first embodiment according to the present invention.

Preferred embodiments of the present invention will be described hereinafter with reference to the accompanying drawings, in which like or corresponding parts are denoted by the same reference numerals.

First Embodiment

Referring to FIG. 1 showing a MD cartridge loading mechanism in a first embodiment according to the first and the second aspect of the present invention, a front panel 31 is provided with a plurality of insertion slots 32 through which cartridges 25 are inserted in the MD cartridge loading mechanism. A cartridge holder storage unit 34 provided with cartridge holder locking devices 44 is disposed behind the insertion slots 32 and contains cartridge holders 35 for holding cartridges 25 inserted therein through the insert slots 32. Eject buttons 41 for ejecting the cartridges 25 through the insert slots 32 are arranged on the front panel 31. In FIG. 1, only part of a case 33 is shown.

Figure 2:
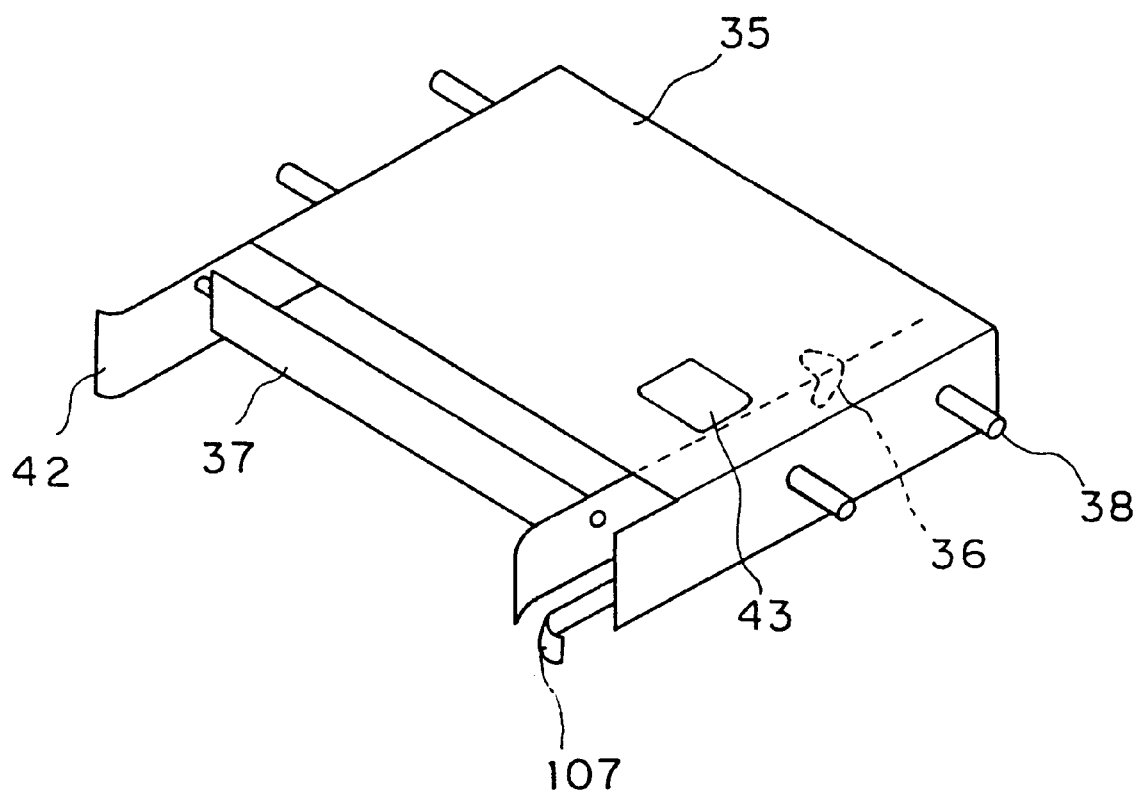
FIG. 2 is a perspective view of a cartridge holder included in the MD cartridge loading mechanism of FIG. 1.

Referring to FIG. 2, each cartridge holder 35 has the shape of a thin box of a metal or a plastic and is provided with a loading hook 36 that engages a recess 22 formed in the cartridge 25 inserted in the cartridge holder 35 to retain the cartridge 25 within the cartridge holder 35.

Figure 3:
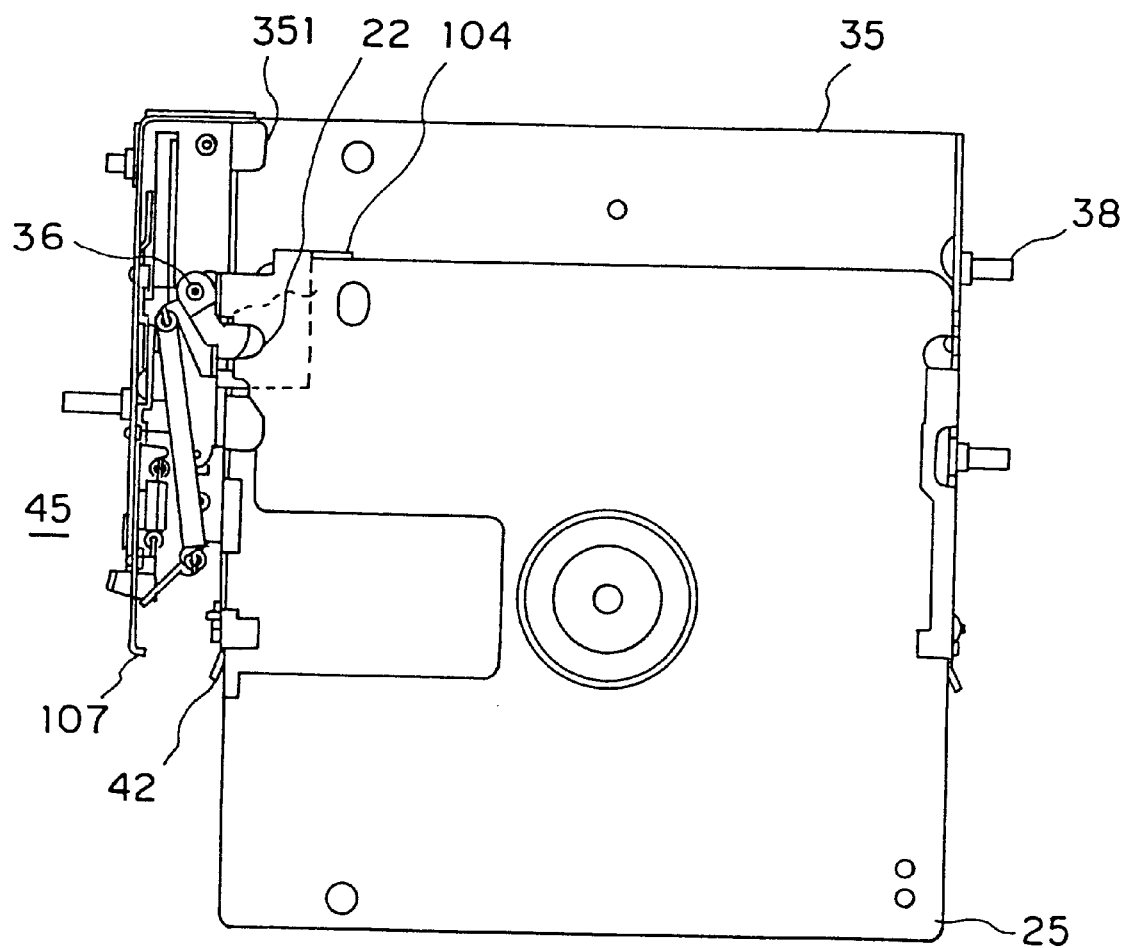
FIG. 3 is a plan view of the cartridge holder of FIG. 2.

FIG. 3 shows the cartridge 25 being inserted in the cartridge holder 35 as viewed from the lower side of the cartridge 25. The loading hook 36 is operated for a locking action to lock the cartridge 25 in place within the cartridge holder 35 and for an ejecting action to eject the cartridge 25 from the cartridge holder 35 by a linkage. The loading hook 36 is supported pivotally on an eject plate 104 which is pushed for movement by the cartridge 25. When the eject plate 104 is pushed fully back to its loaded position, a locking mechanism, not shown, locks the eject plate 104 at the loaded position. Biased toward the recess 22 by a comparatively weak spring, the loading hook 36 can be disengaged from the recess 22 by pushing and pulling the cartridge 25 by hand. When the eject button 41 is pushed to undo the locking mechanism by an eject lever 107, the cartridge 25 is moved snap toward the front several centimeters with the loading hook 36 in engagement with the recess 22. Each cartridge holder 35 is provided with a dust door 37 on its front end. The dust door 37 is closed by a spring, not shown, while the cartridge holder 25 is empty, and is opened when the cartridge 25 is inserted in the cartridge holder 35. Grip pins 38 project from the opposite side walls of the cartridge holder 35, and carriers 39 grip the grip pins 38 to convey the cartridge holder 35. The cartridge holder 35 is provided with guide strips 42 to guide the cartridge 25 smoothly into the cartridge holder 35. The cartridge holder 35 is provided with an opening 43 to pass a light beam for reading information from the disk and to facilitate assembling work. The cartridge holders 35 each containing the cartridge 25 are stored in the cartridge holder storage unit 34 and held in standby at a storage position 26, i.e., a standby position 27.

Referring to FIG. 1, a deck 60 is a reproducing unit or a recording/reproducing unit for both recording and reproducing operation) for reproducing signals recorded on an MD. The deck 60 comprises a cartridge holder locking device 61 for locking the cartridge holder 35 containing the cartridge 25 in place, a turntable 62 fastened to the output shaft of a motor for rotating a disk 16, and a sensor 63. The deck 60 is supported in a floating state on damping supports 64 for isolating the deck 60 from external vibrations. The position of the deck 60 corresponds to a reproducing position 28. The damping supports 64 are connected to both the deck 60 and an elevator 69, only part of which is shown in FIG. 1. The elevator 69 moves vertically to move the deck 60 to a position corresponding to the height of the cartridge holder 35 containing the cartridge 25.

A linear cartridge holder transfer device 70 is formed integrally with the elevator 69. The linear cartridge holder transfer device 70 transfers the cartridge holder 35 from the standby position 27 to the reproducing position 28 or in the reverse direction. The carriers 39 grip the grip pins 38 of the cartridge holder 35 and a motor, not shown, moves the carriers 39 to transfer the cartridge holder 35. The deck 60 and the linear cartridge holder transfer device 70 move vertically together with the elevator 69 and are positioned at a height corresponding to that of the cartridge holder 35 to be transferred onto the deck 60.

Figure 4:
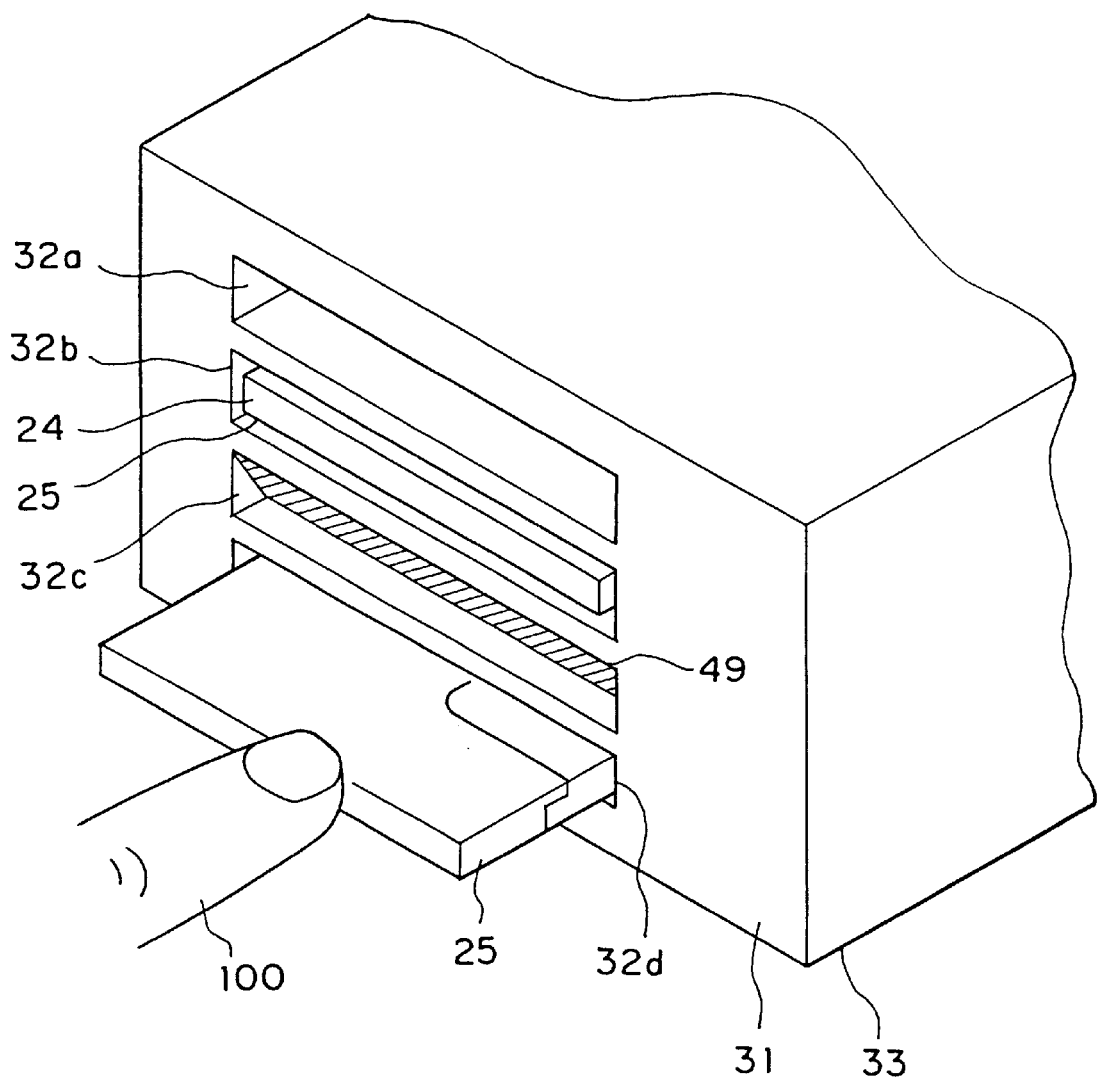
FIG. 4 is a fragmentary perspective view of a MD cartridge loading mechanism in a second embodiment according to the present invention.

Referring to FIG. 4, any cartridge 25 is not inserted in the cartridge holder 35 corresponding to the insertion slot 32a, and a cartridge 25 is inserted in the cartridge holder 35 corresponding to the insertion slot 32b with its back end surface 24 substantially flush with the front surface of the front panel 31. Therefore, the insertion of the cartridge 25 in the cartridge holder 35 can be known with a single glance. A cartridge 25 is being inserted through the insertion slot 32d with a fingertip in the corresponding cartridge holder 35. The condition of the insertion slot 32c will be explained later in connection with the description of a second embodiment.

Thus, the cartridges 25 inserted in the cartridge holders 35 and stored in the cartridge holder storage unit 34 can be recognized with a single glance, and the contents of the MDs of the cartridges 25 inserted in the corresponding cartridge holders 35 can readily be known from the serial numbers of the cartridge 35 or the title of the music written on the back end surfaces 24 of the cartridges 25. The eject button 41, the eject lever 107, the eject plate 104 and the loading hook 36 constitute a cartridge holding device for holding the cartridge 25. The linear cartridge holder transfer device 70 is an example of the holder transfer means.

Second Embodiment

A MD cartridge loading mechanism in a second embodiment according to the third aspect of the present invention is an improvement of the MD cartridge loading mechanism in the first embodiment of the present invention. First the necessity of improving the MD cartridge loading mechanism in the first embodiment will be described.

In the MD cartridge loading mechanism in the first embodiment, the cartridge 25 contained in the cartridge holder 35 set at the reproducing position 28 cannot be seen from outside. Therefore, it is impossible to know the insertion slot through which the cartridge 25 contained in the cartridge holder 35 set at the reproducing 28 position at present was inserted if there are two or more insertion slots 32 in which any rear end surfaces of the cartridges 25 are not exposed and hence it is impossible to determine which insertion slots 32 are available. If a cartridge 25 is inserted mistakenly in the cartridge holder storage unit 34 through the insertion slot 32 through which another cartridge 25 was inserted previously in the cartridge holder 35 set at the reproducing position 28 at present, the cartridge holder 35 set at the reproducing position 28 cannot be returned to its storage position in the cartridge holder storage unit 34. The second embodiment incorporat improvements to solve such a problem.

Referring to FIG. 4, a double-insertion inhibiting plate 49 is seen in the slot 32c while the cartridge holder 35 holding the cartridge 25 inserted therein is set at the reproducing position 28. All the insertion slots 32 are provided with the double-insertion inhibiting plates 49, respectively. Each double-insertion inhibiting plate 49 is operated by the cartridge holder 35 or a linkage, not shown, driven by the elevator 69 so as to as to be set at an open position when the cartridge holder 35 is positioned behind the corresponding insertion slot 32 and to be set at an closing position when the cartridge holder 35 is transferred to the reproducing position 28. Thus, each double-insertion inhibiting plate 49 identifies the insertion slot 32 corresponding to the cartridge holder 35 containing the cartridge 25 and set at the reproducing position 28 at present and inhibits the insertion of a cartridge 25 through the corresponding insertion slot 32 in the cartridge holder storage 7nit 34.

Third Embodiment

Figure 5:
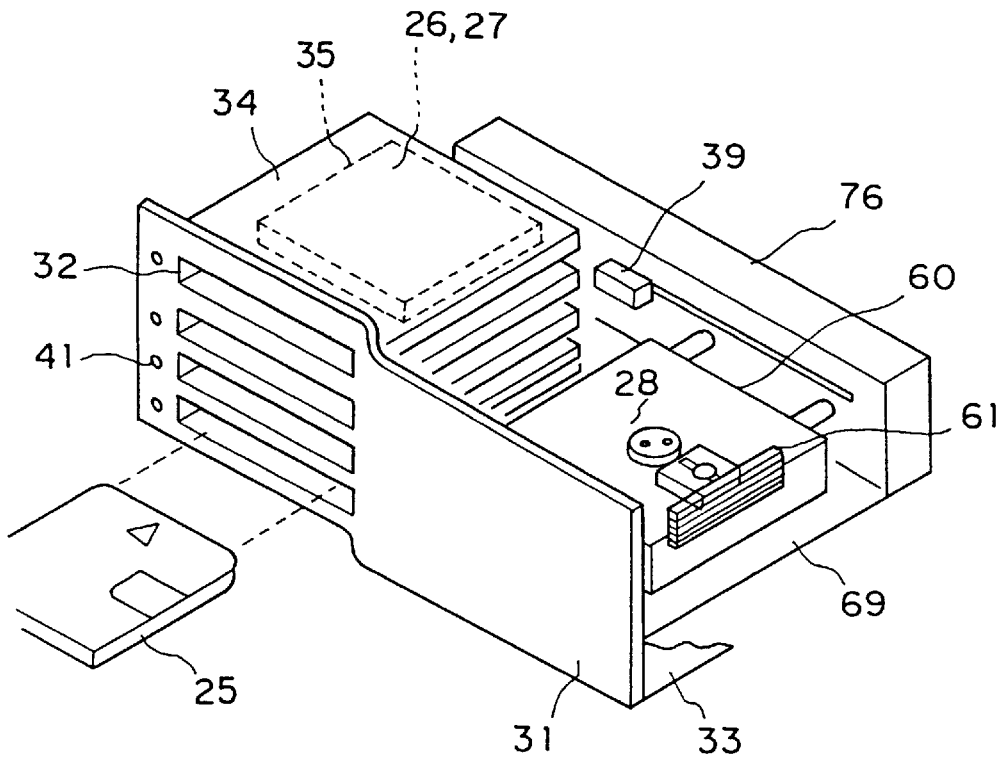
FIG. 5 is a perspective view of a MD cartridge loading mechanism in a third embodiment according to the present invention.
Figure 6:
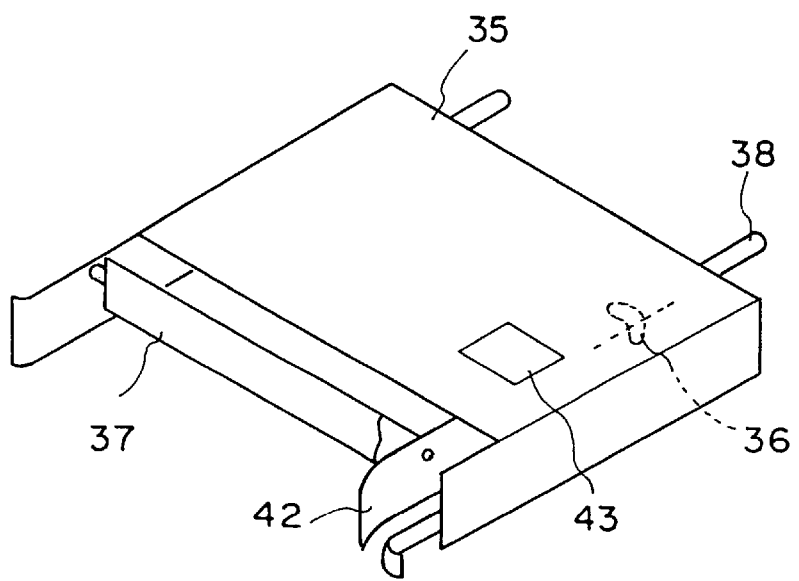
FIG. 6 is a cartridge holder included in the MD loading mechanism of FIG. 5.

Referring to FIG. 5 showing a MD cartridge loading mechanism in a third embodiment according to the first and the fourth aspect of the present invention, a deck 60 is disposed on one side of a cartridge holder storage unit 34 as viewed from the front side of a front panel 31, and an orthogonal cartridge holder transfer device 76 is disposed behind the cartridge holder storage unit 34. The MD cartridge loading mechanism in the third embodiment is provided with cartridge holders 35 shown in FIG. 6. The cartridge holder 35 of FIG. 6 is substantially the same in construction as the cartridge holder 35 of FIG. 2, except that the positions of grip pins 38 are different from those of the grip pins 38 of the cartridge holder 35 of FIG. 2.

Figure 7:
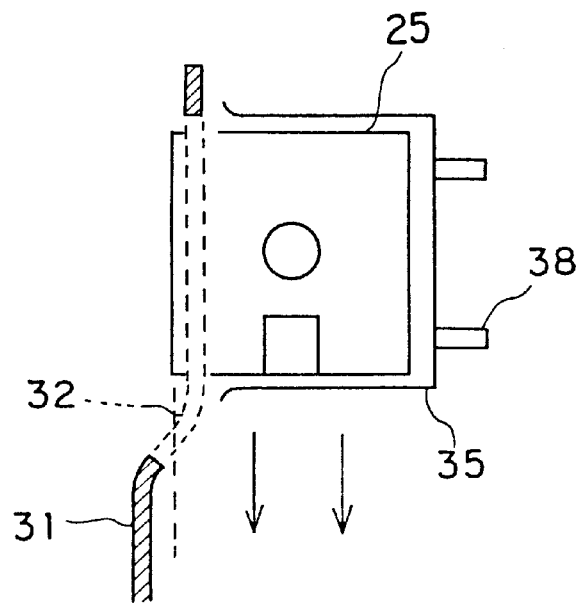
FIG. 7 is a sectional view of a panel included in the MD cartridge loading mechanism of FIG. 5.

The cartridge holder 35 containing a cartridge 25 is carried in a transverse direction, i.e., in a direction perpendicular to the direction of insertion of the cartridge 25 in the cartridge holder 35. As shown in FIG. 7, the front panel 31 is provided with a bent portion formed so as not to obstruct the movement of the cartridge holder 35, and insertion slots 32 are extended into the bent portion. The orthogonal cartridge holder transfer device 76 is an example of the cartridge holder transfer means.

Fourth Embodiment

A MD cartridge loading mechanism in a fourth embodiment according to the fifth aspect of the present invention is realized by incorporating the double-insertion inhibiting plates 49 of FIG. 4 into the MD cartridge loading mechanism of FIG. 5. Hinges, not shown, supporting the double-insertion inhibiting plates 49 are disposed outside paths along which the cartridge holders 35 containing the cartridges 25 travel, respectively, so that the hinges will not obstruct the movement of the cartridge holders 35, which is not very difficult.

Fifth Embodiment

Figure 8:
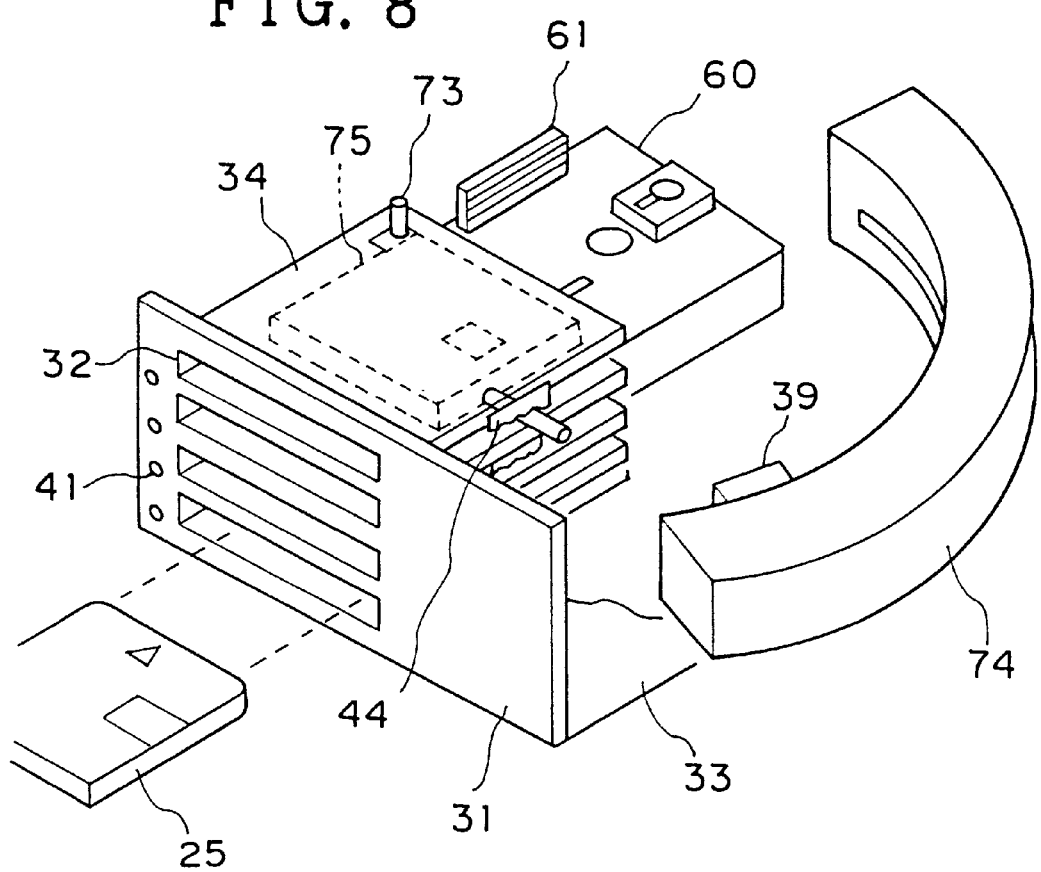
FIG. 8 is a perspective view of a MD cartridge loading mechanism in a fifth embodiment according to the present invention.
Figure 9:
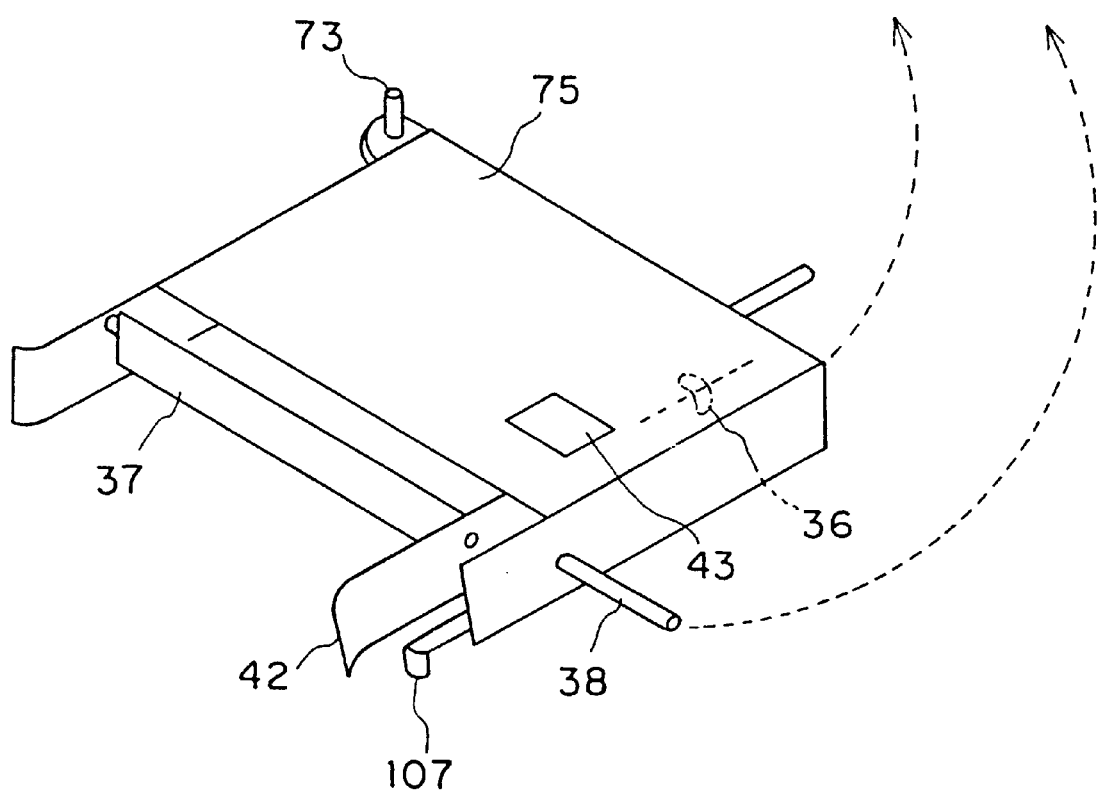
FIG. 9 is a perspective view of a cartridge holder included in the MD cartridge loading mechanism of FIG. 8.
Figure 10:
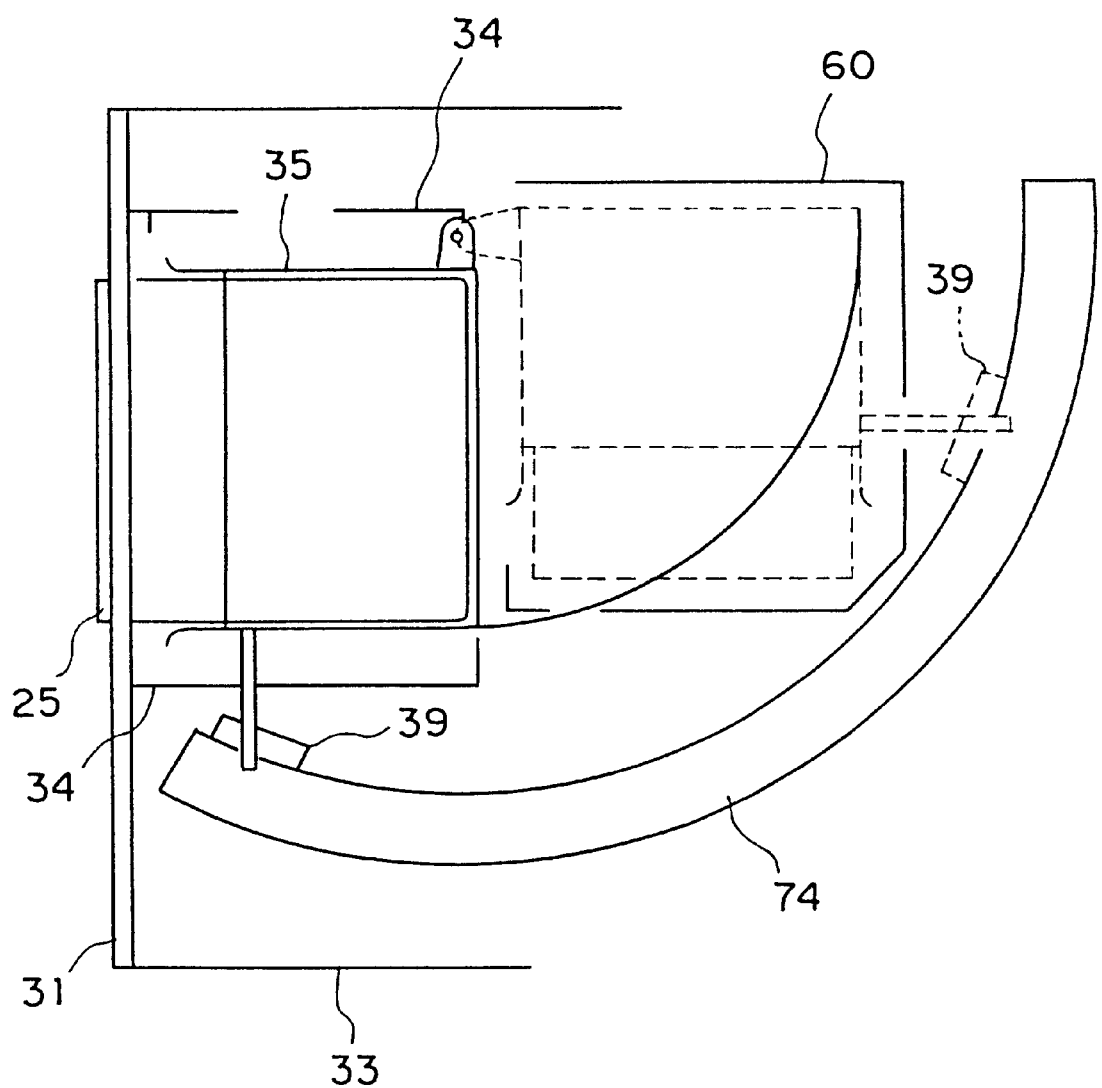
FIG. 10 is a plan view of the MD cartridge loading mechanism of FIG. 8.

A MD cartridge loading mechanism in a fifth embodiment according to the first and the sixth aspect of the present invention is shown in FIG. 8, in which some components of the MD cartridge loading mechanism are dislocated from their correct positions to facilitate understanding the construction. FIG. 9 shows a turning cartridge holder 75 employed in the MD cartridge loading mechanism of FIG. 8, and FIG. 10 is a top plan view of the MD cartridge loading mechanism of FIG. 8.

Referring to FIG. 8, a circular cartridge holder transfer device 74 turns the turning cartridge holder 75 from a standby position to a reproducing position through an angle of about 90°, and is provided with a carrier 39, which is similar to the carrier 39 shown in FIG. 1. As shown in FIG. 9, the turning cartridge holder 75 is provided with a pivot 73 in one corner thereof, and a grip pin 38 at a position diagonally opposite the pivot 73. The back side and one side of a cartridge holder storage unit 34 are open so that the turning cartridge holders 75 can be turned on their pivots 73 out of the cartridge holder storage unit 34. The back end surface of each of cartridges 25 inserted through insertion slots 32 in the turning cartridge holders 75 held at a standby position 27 is exposed in the corresponding insertion slot 32 and can be ejected from the MD cartridge loading mechanism by operating an eject button 41.

Sixth Embodiment

Figure 11:
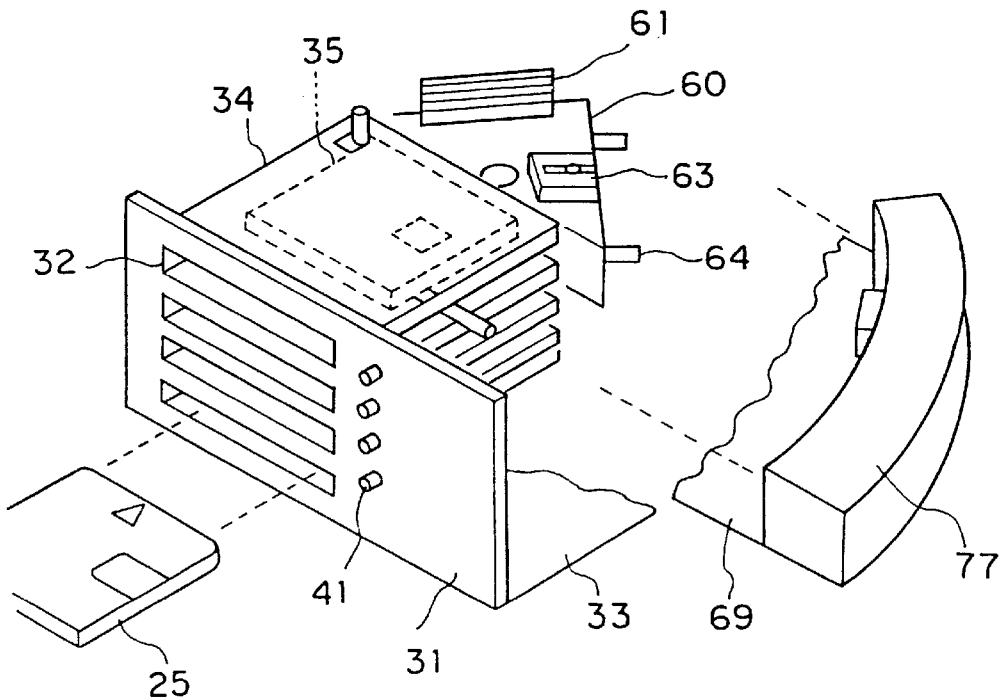
FIG. 11 is a perspective view of a MD cartridge loading mechanism in a sixth embodiment according to the present invention.

Referring to FIG. 11 showing a MD cartridge loading mechanism in a sixth embodiment according to the seventh aspect of the present invention, the MD cartridge loading mechanism is provided with turning cartridge holders 75, which is similar to the turning cartridge holders 75 shown in FIG. 8. A circular cartridge holder transfer device 77 turns the turning cartridge holder 75 from a standby position to a reproducing position through an angle of 45°. A deck 60 is disposed relative to a cartridge holder storage unit so that the turning cartridge holder 75 is located at a reproducing position on the deck 60 when the turning cartridge holder 75 is turned through an angle of 45° from the standby position.

Figure 12:
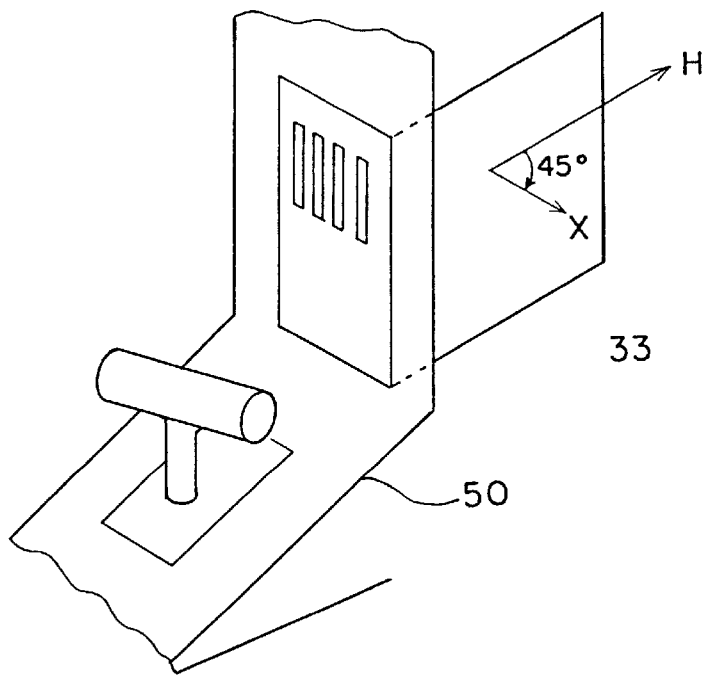
FIG. 12 is a fragmentary perspective view of assistance in explaining a manner of installing the MD cartridge loading mechanism of FIG. 11 in a longitudinal position on a MD reproducing apparatus.
Figure 13:
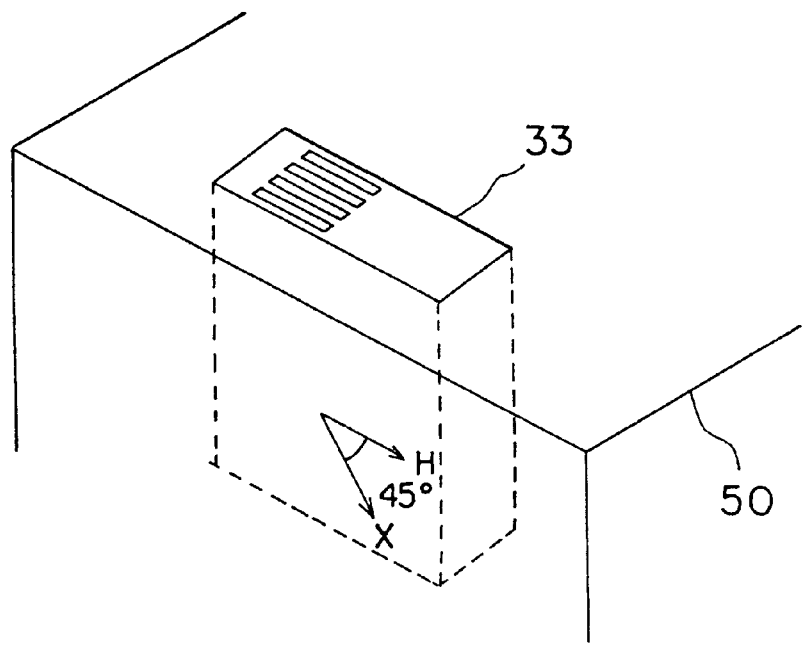
FIG. 13 is fragmentary perspective view of assistance in explaining a manner of installing the MD cartridge loading mechanism of FIG. 11 in a transverse position on a MD reproducing apparatus.

A sensor 63 moves along a line inclined at an angle of 45° to a horizontal line when this MD cartridge loading mechanism is installed in a MD reproducing apparatus in a transverse position as shown in FIG. 12 or in a longitudinal position as shown in FIG. 13. Therefore, the functional characteristics of the sensor 63 is not affected by the position of the MD cartridge loading mechanism. A cartridge holder transfer device 77 shown in FIG. 11 is called an oblique turning cartridge holder transfer means. In FIGS. 12 and 13, indicated at 50 is the console of the MD reproducing apparatus.

Seventh Embodiment

Figure 14:
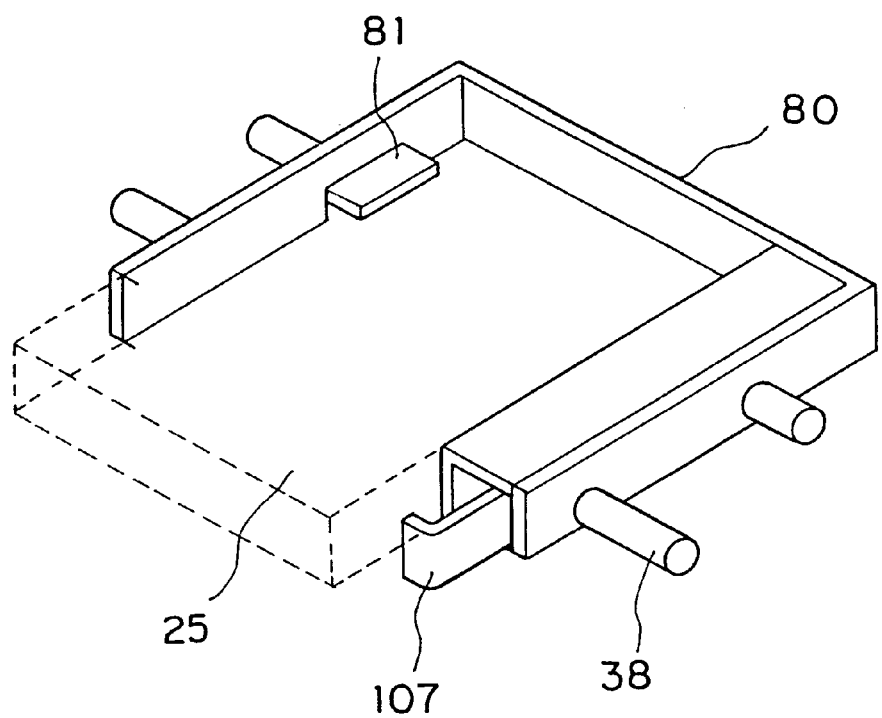
FIG. 14 is a perspective view of one of cartridge holders included in a MD cartridge loading mechanism in a seventh embodiment according to the present invention.
Figure 15:
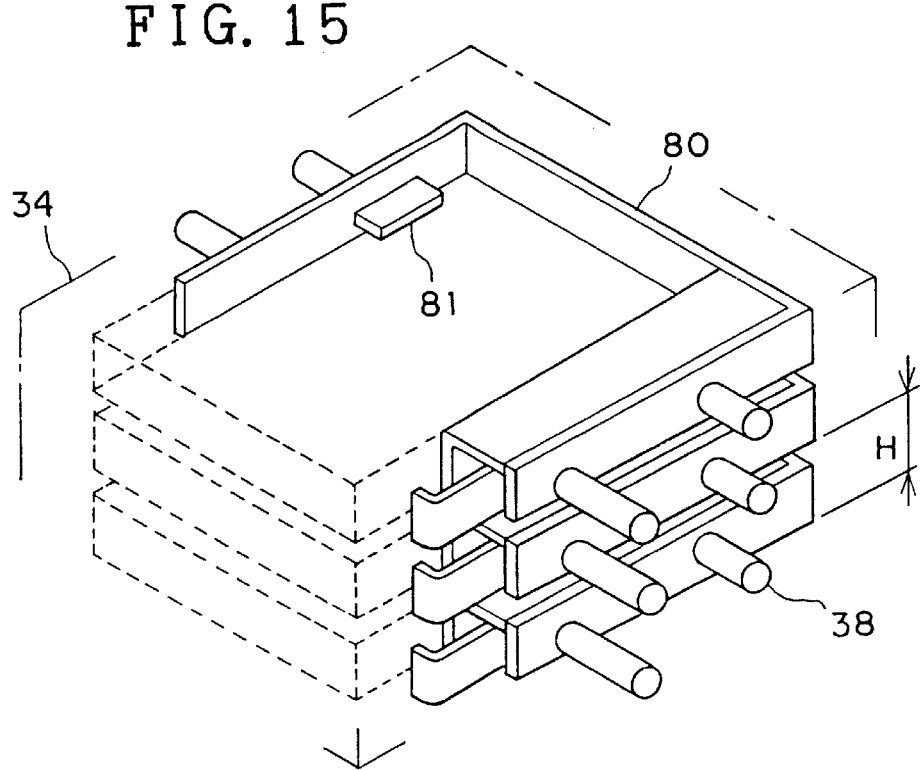
FIG. 15 is a perspective view of the cartridge holders of FIG. 14.
Figure 41:
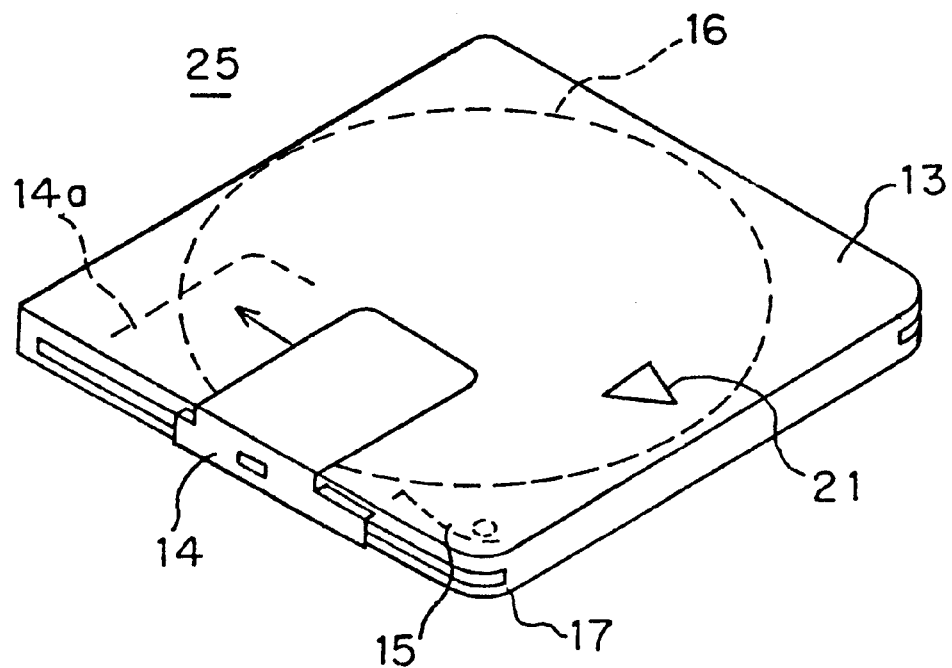
FIG. 41 is a perspective view of a MD cartridge as viewed from the front side thereof.
Figure 42:
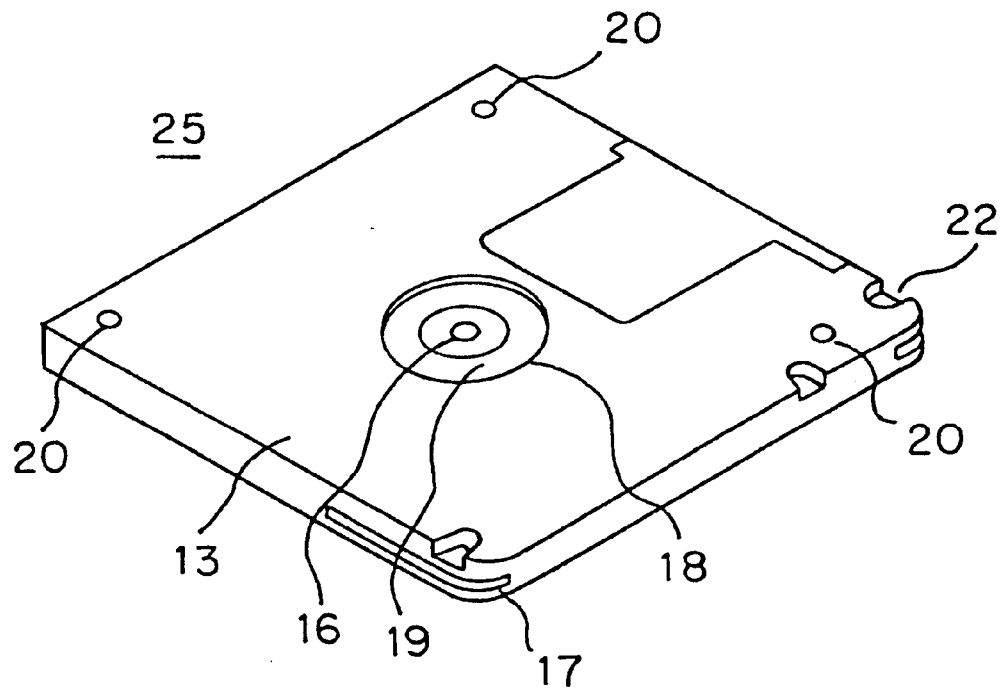
FIG. 42 is a perspective view of the MD cartridge of FIG. 41 as viewed from the back side thereof.
Figure 43:
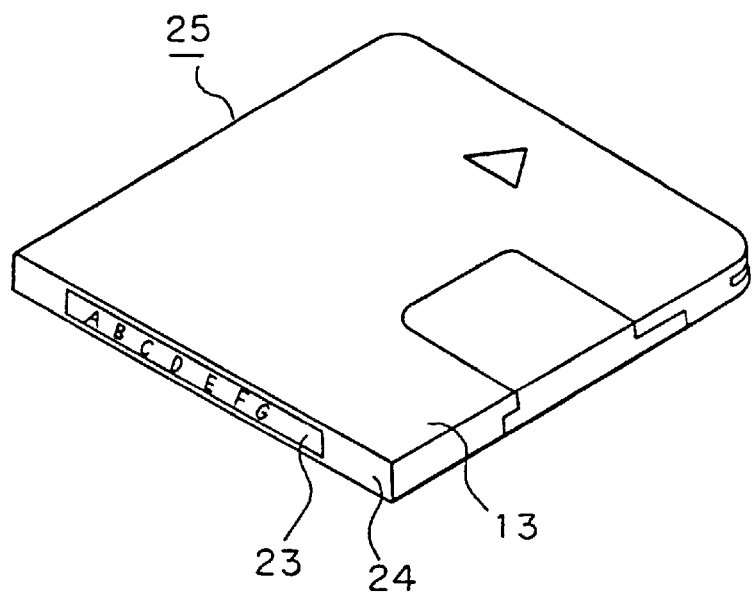
FIG. 43 is a perspective view of a cartridge.
Figure 44:
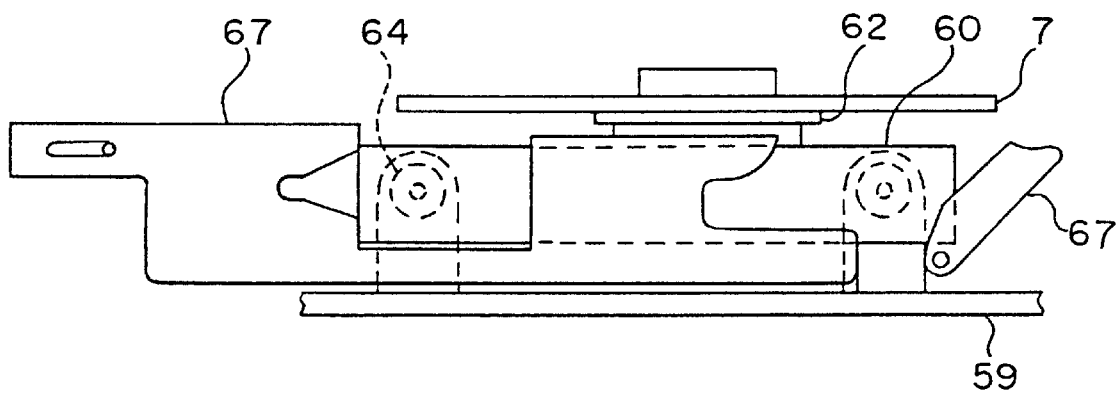
FIG. 44 is a side view of the floating deck of a conventional CD reproducing apparatus.
Figure 45:
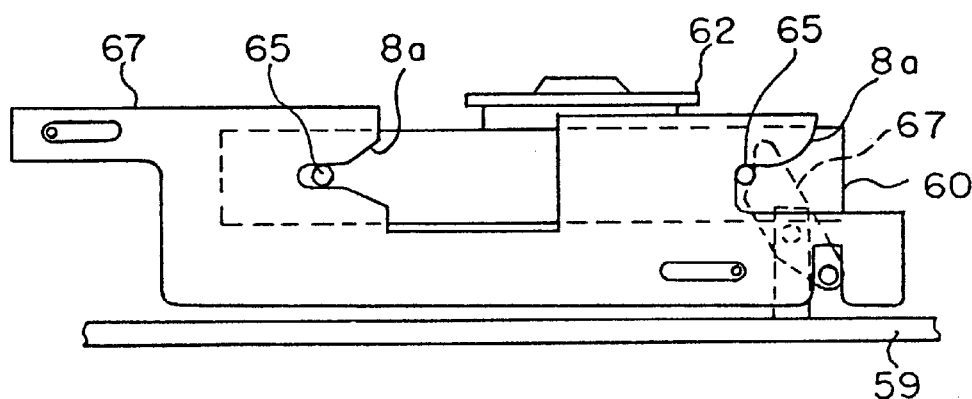
FIG. 45 is a side view of the floating deck of FIG. 44.
Figure 46:
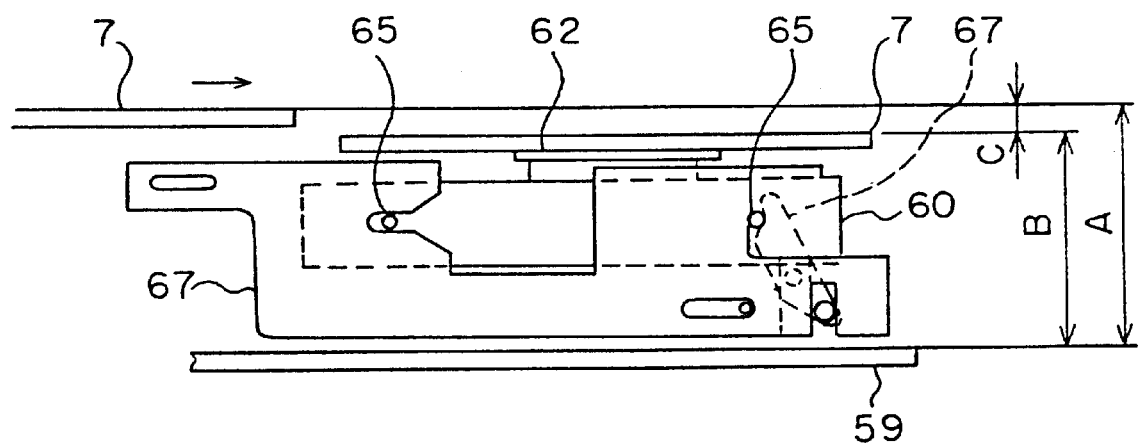
FIG. 46 is a side view of assistance in explaining the disk transfer operation of the conventional CD reproducing apparatus.

FIG. 14 shows a cartridge holder 80 employed in a MD cartridge loading mechanism in a seventh embodiment according to the eighth aspect of the present invention, and FIG. 15 shows cartridge holders 80 stacked in a cartridge holder storage unit 34. The cartridge holders 80 shown in FIGS. 14 and 15 can be incorporated into the MD cartridge loading mechanism of a basic construction in the first embodiment. As shown in FIG. 2, each of the cartridge holder 35 employed in the MD loading mechanism in the first embodiment consists of a top wall, a bottom wall and opposite side walls, and formed in the shape of a thin box capable of snugly receiving the cartridge 25. Since each cartridge holder 35 has the top wall and the bottom wall, the height of a stack of the cartridge holders 35 is comparatively large. As shown in FIG. 14, the cartridge holder 80 has the shape of a U-shaped frame and is provided with grip pins 38 and guide lugs 81. In FIG. 14, indicated at 107 is an eject lever for ejecting the cartridge holder 80, in engagement with a loading hook 36, not shown in FIG. 14, and at 25 is a cartridge inserted in the cartridge holder 80. The cartridge holder 80 has only strip-shaped frame members that extend respectively along the side surfaces of the cartridge 25, and is not provided with any top wall and any bottom wall. When the cartridge 25 is inserted in the cartridge holder 80, the guide lugs 81 of the cartridge holder 80 engage grooves 17 (FIG. 41) formed in the opposite side walls of the cartridge 25 to retain the cartridge 25 in the cartridge holder 80.

FIG. 15 shows the plurality of U-shaped cartridge holders 80 shown in FIG. 14 stacked in a cartridge holder storage unit 34. As is obvious from FIG. 15, the height H of a space required for storing each U-shaped cartridge holder 80 is small as compared with that of a space required for storing the cartridge holder 35 of FIG. 2, because the cartridge holder 80 is not provided with any top wall and any bottom wall. Accordingly, height of the cartridge holder storage unit 34 for storing the cartridge holders 80 is smaller than that of the cartridge holder storage unit for storing the same number of the cartridge holders 35.

Eighth Embodiment

In each of the first to the seventh embodiment, as shown, for example, in FIG. 4, the cartridge 25 is inserted through the insertion slot 32 in the cartridge holder and the cartridge 25 is held in the cartridge holder 35 so that the back end surface is substantially flush with the front surface of the front panel 31. Therefore, in the final stage of insertion of the cartridge 25, the cartridge 25 can not be held with fingers to adjust the direction of insertion and can only be pushed with a fingertip. Consequently, it is possible that the cartridge 25 is inserted obliquely in the cartridge holder 35, the guide strips 42 of the cartridge holder 35 is broken by an excessively large force applied thereto by the cartridge 25, the cartridge holder 35 is dislocated from its correct position relative to the insertion slot 32, the cartridge 25 cannot smoothly inserted in the cartridge holder 35 and/or the cartridge 25 is caught by the front panel 31 and cannot be ejected.

Furthermore, if the cartridge 25 is held with fingers when the cartridge holder 35 holding the cartridge 25 is about to be transferred, it is possible that the loading hook 36 of the cartridge holder 35 is broken, the carrier 39 of the cartridge holder transfer device 70 is broken and/or the cartridge holder 35 containing the cartridge 25 cannot correctly be transferred to the reproducing position. If the cartridge 25 is inserted through the insertion slot 32 in the cartridge holder 35 with, for example, a very slender finger beyond a correct holding position in the cartridge holder 35, it is possible that portions of the cartridge 25 in contact with the cartridge holder 35 and the cartridge holder 35 are deformed or broken.

Moreover, when the cartridge 25 is pushed at an indefinite part on the back end thereof to insert the same in the cartridge holder 35, the cartridge 25 is moved at a slant and is caught in the slot 32 or the cartridge 25 cannot correctly be inserted in the cartridge holder.

In brief, in the MD cartridge loading mechanisms in the first to the seventh embodiment, it is not easy to insert the cartridge 25 smoothly and correctly in the cartridge holder 35. FIGS. 16 to 19 show improvements in accordance with the eighth to the tenth aspect of the present invention for solving those problems in inserting the cartridge through the insertion slot in the cartridge holder in the first to the seventh embodiments.

Figure 16:
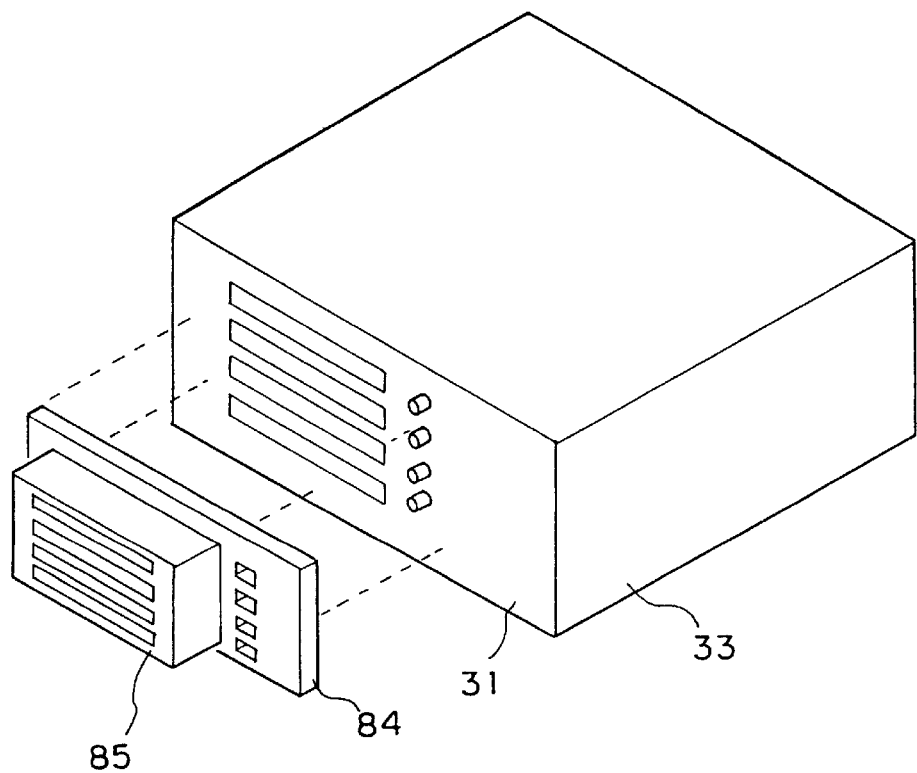
FIG. 16 is a perspective view of a MD cartridge loading mechanism in an eighth embodiment according to the present invention.

Referring to FIG. 16 showing a MD cartridge loading mechanism constituted by incorporating the eighth to the tenth aspect of the present invention to one of the first to the seventh aspect of the present invention, a guide panel 84 is provided with insertion slots 85 each having dimensions, i.e., a width, a height and a depth, suitable for guiding a cartridge 25 in a straight position and is attached to the front surface of a front panel 31. The suitable depth of each insertion slot is about 15 mm.

Figure 17:
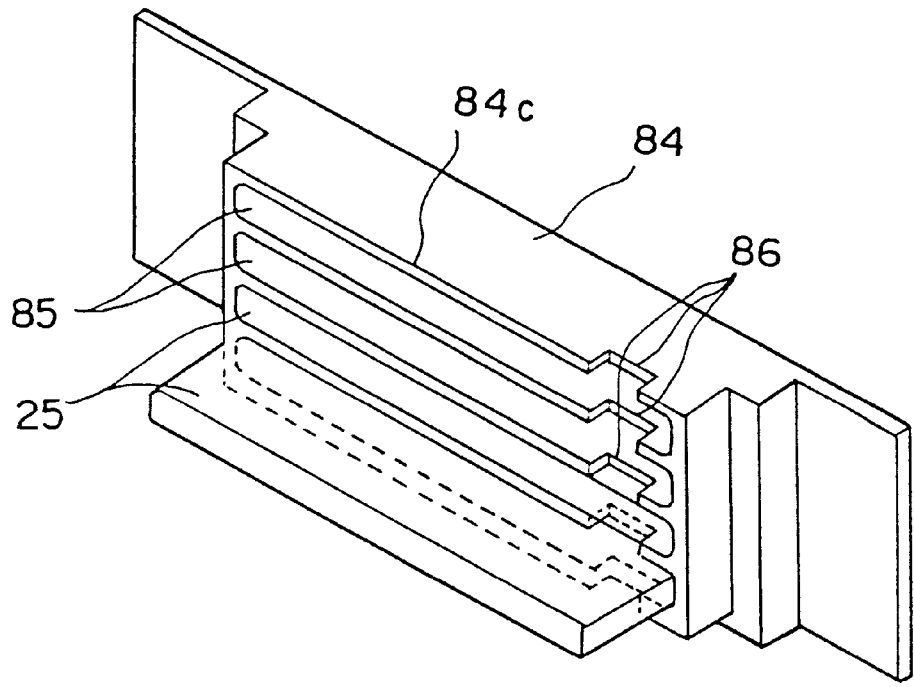
FIG. 17 is a perspective view of a guide panel applicable to the MD cartridge loading mechanism of FIG. 16.
Figure 18:
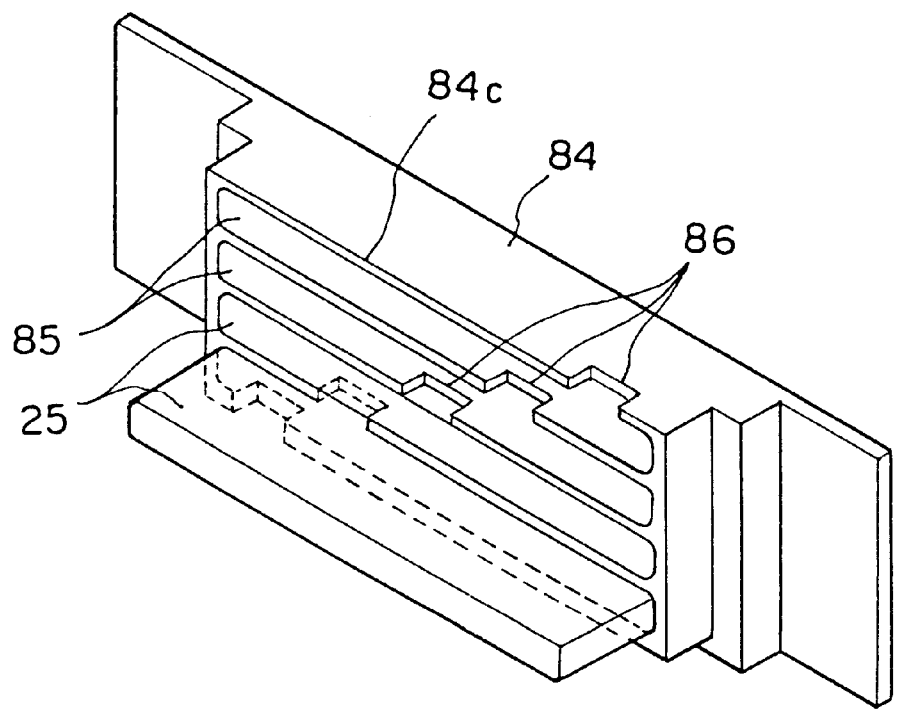
FIG. 18 is a perspective view of another guide panel applicable to the MD cartridge loading mechanism of FIG. 16.
Figure 19:
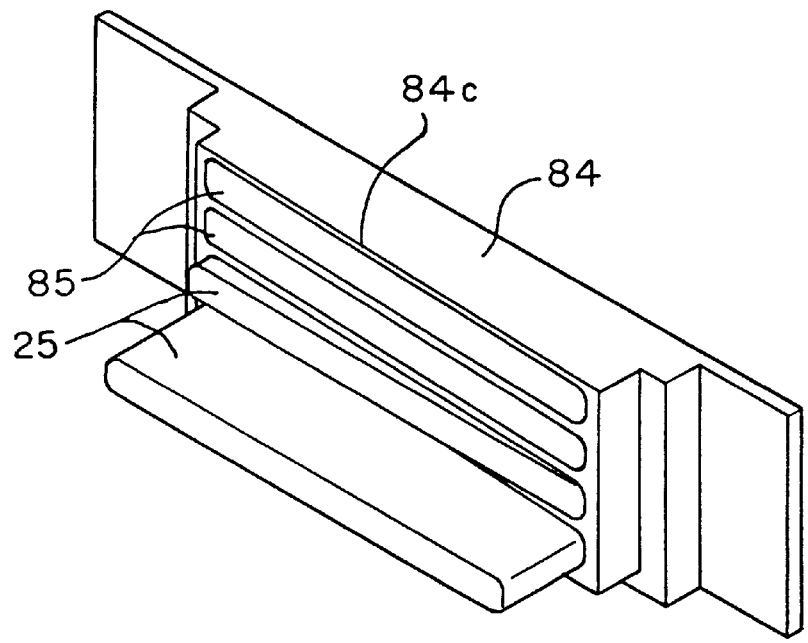
FIG. 19 is a perspective view of a third guide panel applicable to the MD cartridge loading mechanism of FIG. 16.

FIGS. 17 to 19 show modifications of the guide panel 84 of FIG. 16. A guide panel 84 of FIG. 17 is provided with a recess 86 at a given position in each of transverse slats demarcating the insertion slots 85. A cartridge 25 can be held in the cartridge holder only when the cartridge 25 is inserted in the insertion slot 85 by pushing the cartridge 25 at a portion corresponding to the recess 86 as deep as the back end surface of the cartridge 25 is flush with the bottom surface of the recess 86. If the cartridge 25 is inserted in the insertion slot 85 as deep as the back end surface is flush with the front surface of the guide panel 84, the cartridge 25 is pushed out automatically from the insertion slot 85. Thus, the cartridge 25 can correctly be inserted in the cartridge holder only when the cartridge 25 is pushed at the portion corresponding to the recess 86.

FIG. 18 shows another improved guide panel 84, in which recesses 86 are arranged at pitches approximately equal to the width of the recess 86. Thus, the back end of the cartridge 25 being inserted in the cartridge holder cannot be held between fingers and hence some of the aforesaid problems can be solved. Although the cartridges 25 to be inserted through different insertion slots 85 must be pushed at different portions on their back end surfaces because the different insertion slots 86 are provided with the recesses 86 at different positions, respectively, no problem will arise when the cartridge holders 35 respectively corresponding to the insertion slits 85 are constructed according to the positions of the recesses 86.

FIG. 19 shows a third improved guide panel 84, in which the front surface of the guide panel 84 is declined to the left, as viewed in FIG. 19, with respect to a plane perpendicular to the side surfaces of insertion slots 85. Therefore, a cartridge 25 can correctly be inserted in the cartridge holder 35 so that the cartridge 25 is caught by the loading hook 36 only when the cartridge 25 is pushed at a portion near the left end, as viewed in FIG. 19, of the back end surface thereof.

Ninth Embodiment

Figure 20:
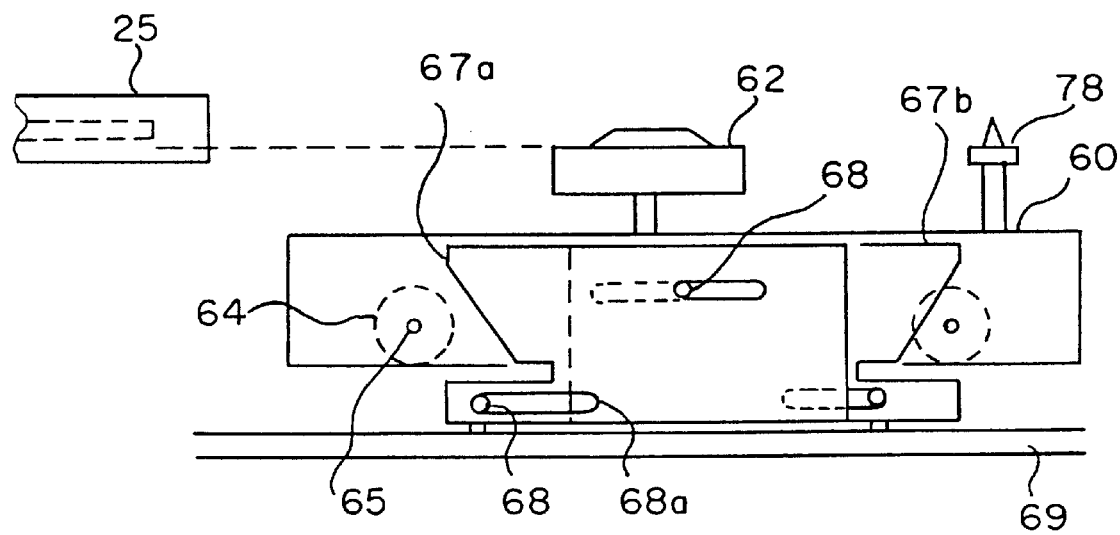
FIG. 20 is a schematic side view of a cartridge holder transfer device included in a MD cartridge loading mechanism in a ninth embodiment according to the present invention.
Figure 21:
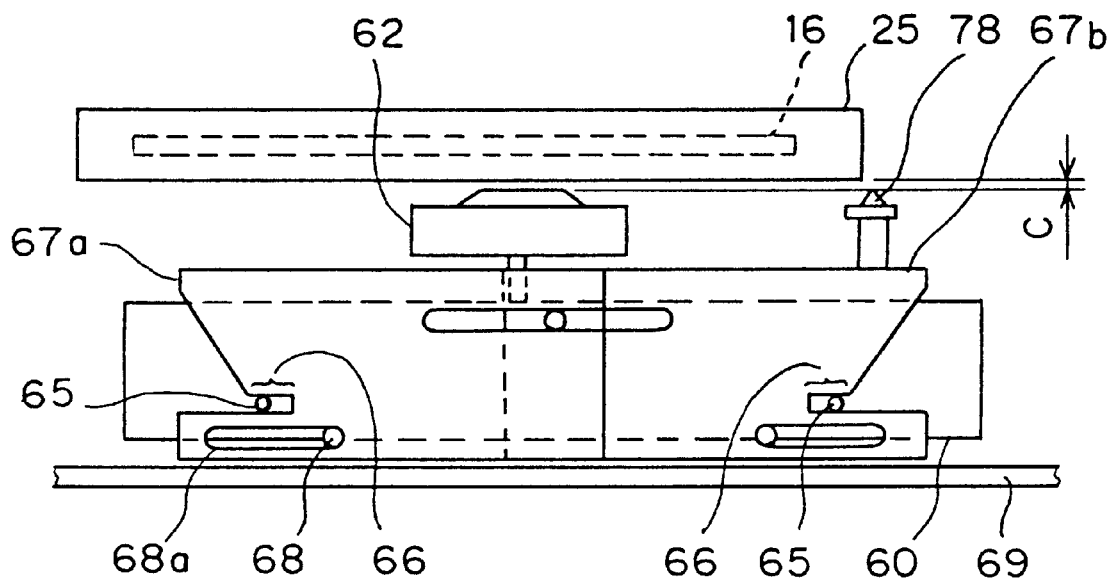
FIG. 21 is a schematic side view of the cartridge holder transfer device of FIG. 20 in a state where a cartridge is disposed opposite to a turntable.
Figure 22A:
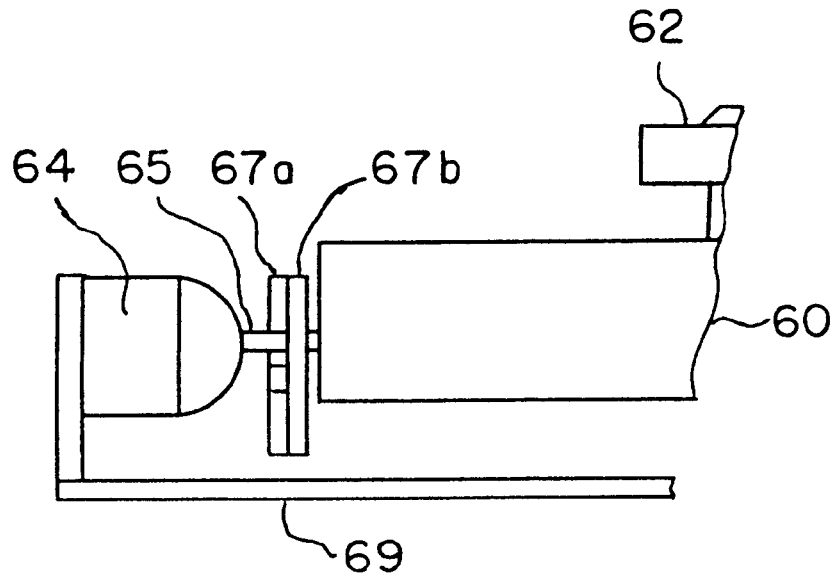
FIGS. 22(a) and 22(b) are fragmentary front views of the cartridge holder transfer device of FIG. 20.
Figure 22B:
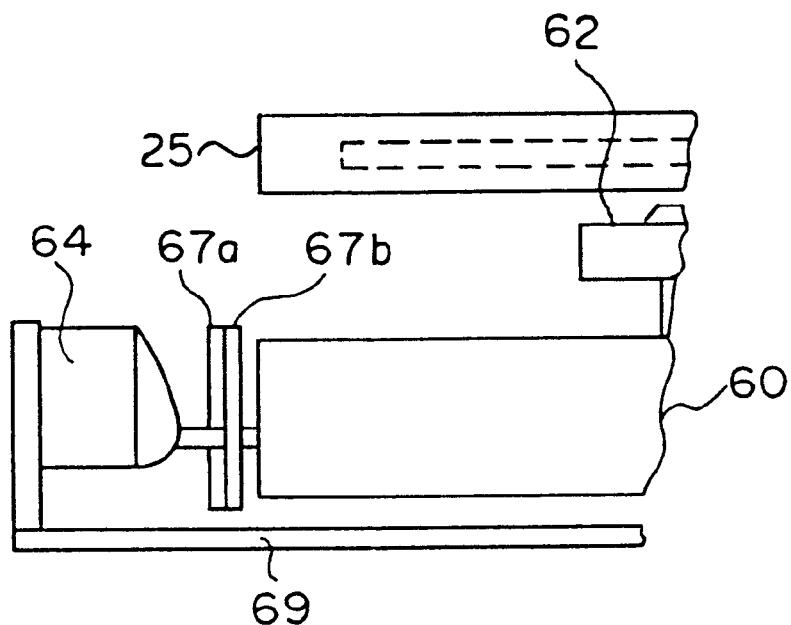
Figure 23:
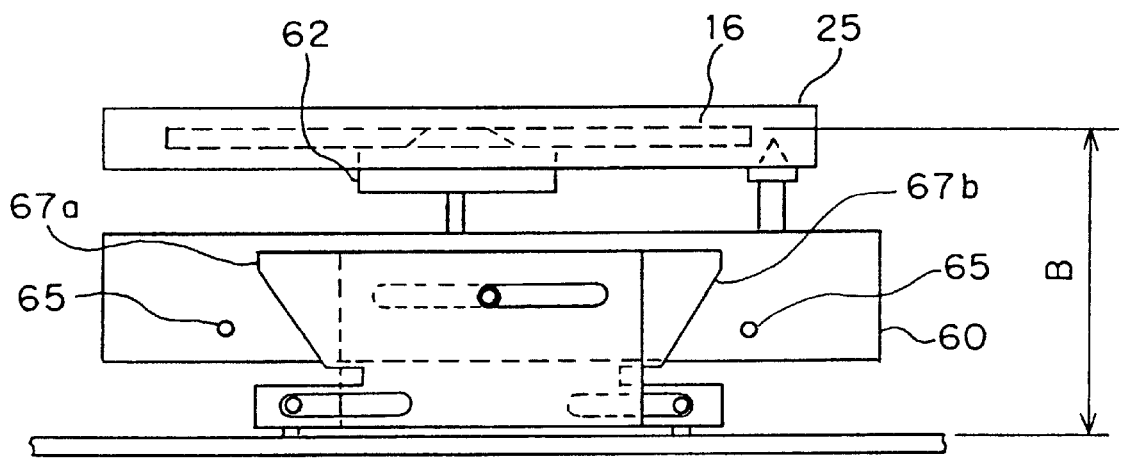
FIG. 23 is a side view of a floating deck and a cartridge disposed at a reproducing position relative to the floating deck.
Figure 24:
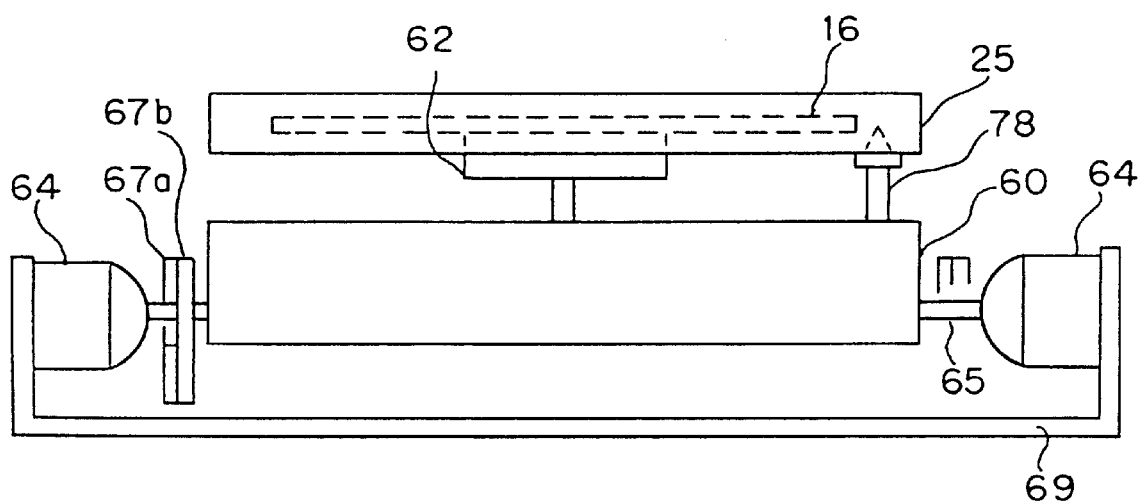
FIG. 24 is a front view corresponding to FIG. 23.

FIG. 20 is a side view of a floating deck 60, in which part of a cartridge holder transfer device is shown, a cartridge 25 is spaced apart from a turntable 62 and a floating deck 60 is in a free state, FIG. 21 is a side view of the floating deck 60, in which a cartridge 25 is located opposite to the turntable 62 and the turntable 62 is in a fixed state, FIG. 22(a) is a front view of the floating deck 60 in the state shown in FIG. 20, FIG. 22(b) is a front view of the floating deck 60 in the state shown in FIG. 21, FIG. 23 is a side view of the floating deck 60, in which a cartridge 25 is mounted on the turntable 62, and FIG. 24 is a front view of the floating deck 60 in the state shown in FIG. 23.

Referring to FIGS. 20 to 24, locking plates 67a and 67b are provided with recesses 66, respectively, pins 68 attached to an elevator 69 are fitted in slots 68a formed in the locking plates 67a and 67b to guide the locking plates 67a and 67b for transverse reciprocation in opposite directions. The locking plates 67a and 67b are driven for transverse reciprocation by a driving mechanism, not shown. Each of damping supports 64 has a pin 65 projecting from the floating deck 60, and an elastic member formed of rubber or the like, joined to the extremity of the pin 65 and attached to the elevator 69. A plurality of reference pin 78, only one of which is shown, projecting upward from the floating deck 60 locate a cartridge 25 with respect to horizontal and vertical directions on a turntable 62.

In a state shown in FIG. 20, the locking plates 67a and 67b have been moved to their innermost positions, and the floating deck 60 is supported at a fixed position in a floating state on the elevator 69 by the damping supports 64 in a state as shown in FIG. 22(a) with the upper surface of the turntable 62 at a height above the height of the lower surface of the cartridge 25. If the cartridge 25 is moved horizontally toward the turntable 62 in this state, the cartridge 25 collides against the turntable 62.

To avoid the collision of the cartridge 25 against the turntable 62, the locking plates 67a and 67b are moved outward, namely, away from each other, to depress the pins 65 downward with the inclined edges formed at the left-hand end of the locking plate 67a and at the right-hand end of the locking plate 67b, and to bring the recesses 66 into engagement with the corresponding pins 65, so that the floating deck 60 is lowered and locked at a lower position as shown in FIG. 21. In this state, the damping supports 64 are deformed in a shape shown in FIG. 22(b), and a gap of a size C (FIG. 21) is formed between a horizontal plane including the tips of the reference pins 78 or the surface of the depressed turntable 62, and a horizontal plane including the lower surface of the cartridge 25, so that the cartridge 25 can be positioned at a loading position over the turntable 62 without being obstructed by the turntable 62. After thus correctly positioning the cartridge 25 at the loading position over the turntable 62, the locking plates 67a and 67b are moved to their innermost positions to release the pins 65 from the recesses 66 so that the floating deck 60 can be returned to its upper operating position by the resilience of the damping supports 64 and suspension springs, not shown, and, consequently, the cartridge 25 is located correctly by the reference pins 78 and is set in place on the turntable 62. Thus, the floating deck 60 is supported in a floating state on the elevator 69, and an optical pickup head, not shown, reads information from the disk 16 of the cartridge 25.

Although the pins 65 of the damping supports 64 are used also as the locking pins in this embodiment, the floating deck 60 may be provided with pins that serve specially for locking the floating deck 60. The locking plates 67a and 67b are floating deck locking means.

This embodiment is not limited in its application to the deck locking mechanism for locking the floating deck of a disk recording/reproducing apparatus or a MD recording/reproducing apparatus; the embodiment is applicable also to locking the floating deck of a magnetic disk recording/reproducing apparatus.

Tenth Embodiment

Figure 25:
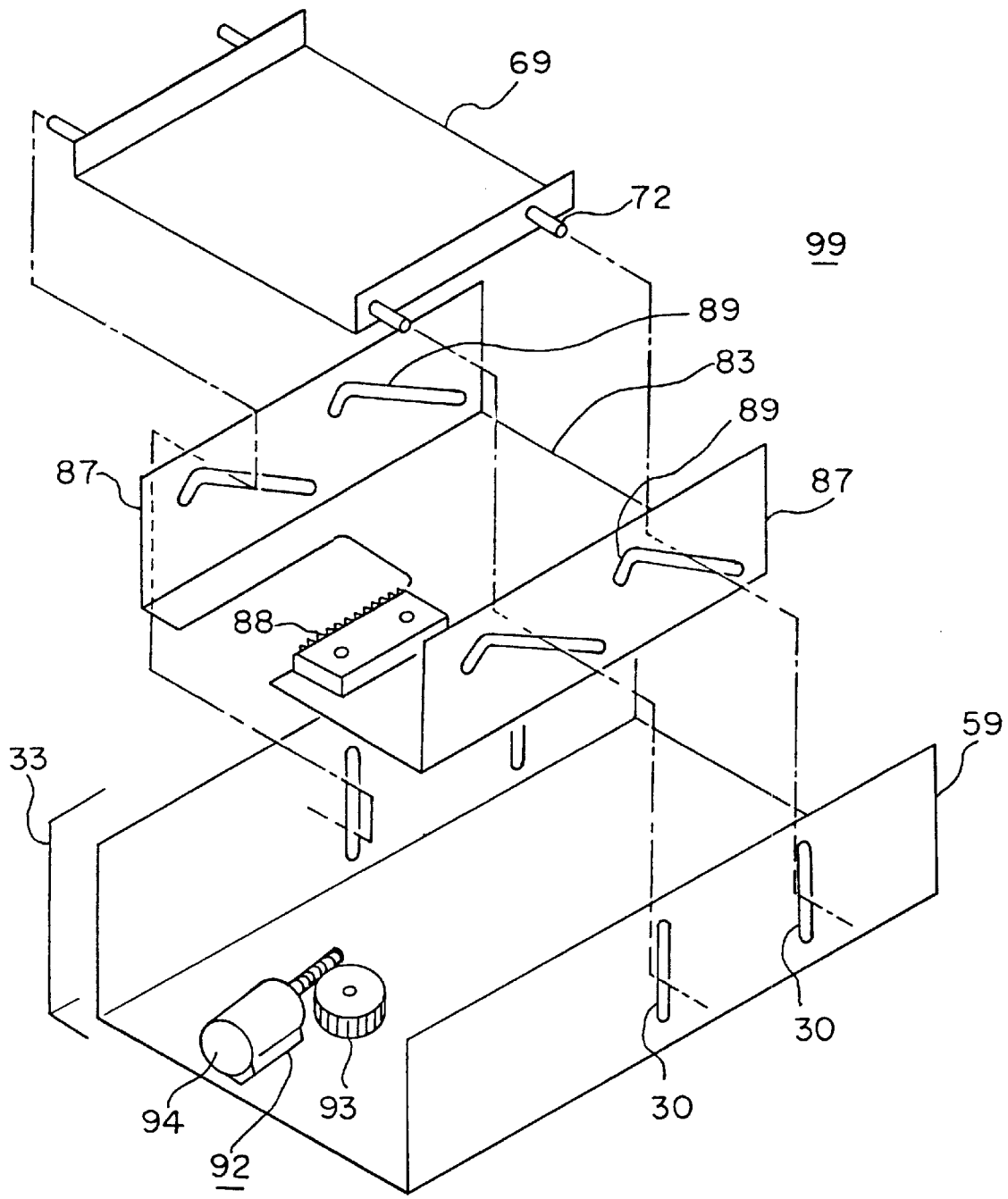
FIG. 25 is a fragmentary, exploded perspective view of a cartridge holder transfer device.

FIGS. 25 to 32 show a cartridge holder transfer device in a tenth embodiment according to the thirteenth aspect of the present invention. FIG. 25 is an exploded perspective view of an elevator driving mechanism for driving an elevator 69, included in the cartridge holder transfer device. Referring to FIG. 25, a frame 59 is fixedly disposed within a case 33, and a pair of cam plates 87 are supported for longitudinal sliding movement (sliding movement to the right and to the left as viewed in FIG. 25) within the frame 59, and interconnected by a connecting plate 83. Each cam plate 87 is provided with cam slots 89. A rack 88 is attached to the central portion of one end of the connecting plate 83. Two slide pins 72 project from each of the opposite side walls of the elevator 69 so as to extend through the cam slots 89, and vertical guide slots 30 formed in each of the opposite side walls of of the frame 59, respectively. The cam plates 87 provided with the cam slots 89, and the connecting plate 83 provided with the rack 88 constitute a step plate 99. A pinion 93 is supported for rotation on the frame 59, and a motor 94 mounted on the frame 59 drives the pinion 93 by means of a worm or the like. When the step plate 99 and the frame 59 are combined, the pinion 93 engages the rack 88 fixed to the step plate 99.

Figure 26:
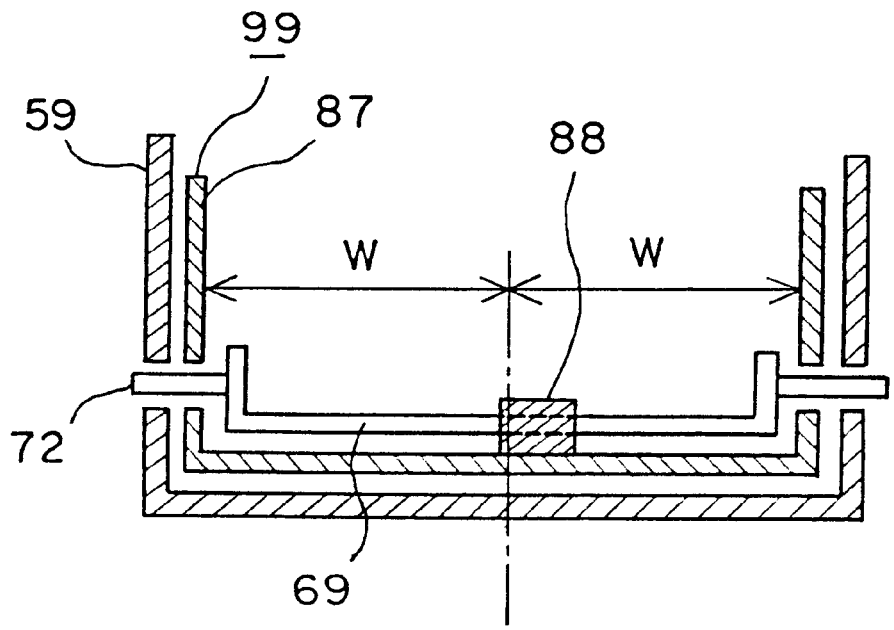
FIG. 26 is a sectional front view of the cartridge holder transfer device of FIG. 25.

Referring to FIG. 26 showing an assembly of the frame 59, the step plate 99, the elevator 69 and the slide pins 72, a driving mechanism 92 comprises the motor 94 and the pinion 93. The motor 94 drives the pinion 93 for rotation to move the step plate 99 longitudinally and, consequently, the elevator 69 having the slide pins 72 extending through the vertical slots 30 is moved vertically. Since the rack 88 is disposed with its pitch line in alignment with the longitudinal center line of the connecting plate 83 interconnecting the pair of cam plates 87, the step plate 99 will not be moved on the skew and will not be jammed when the rack 88 is driven in either direction by the pinion 93.

Figure 27A:
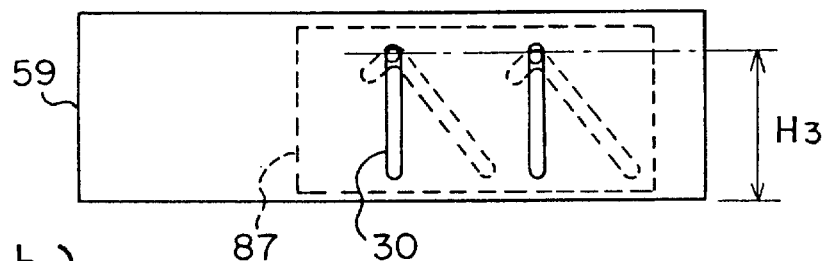
FIGS. 27(a), 27(b), 27(c) and 27(d) are schematic views of assistance in explaining the operation of the cartridge holder transfer device of FIG. 25.
Figure 27B:
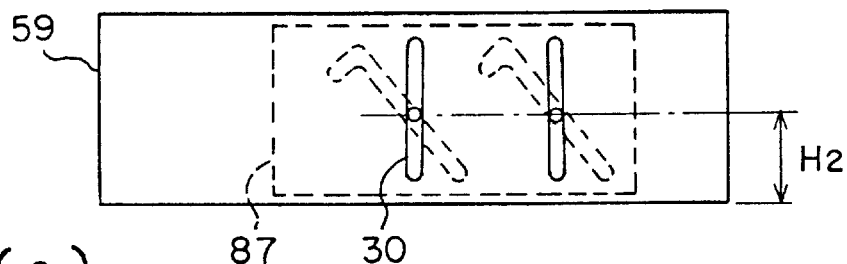
Figure 27C:
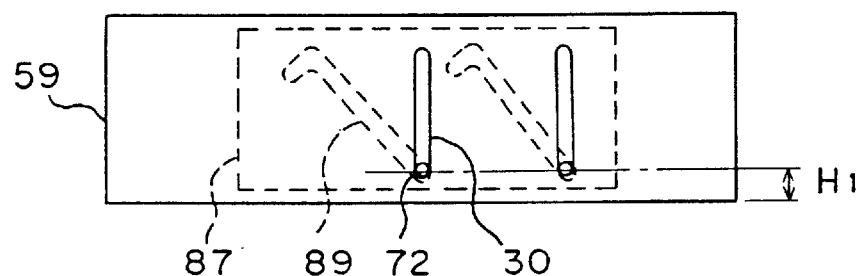
Figure 27D:
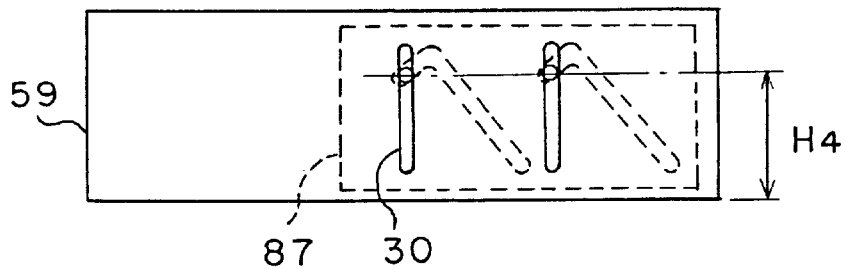

FIGS. 27(a) to 27(d) are views of assistance in explaining the position of the slide pins 72 of the elevator 69 in the vertical slots 30 in relation to the movement of the cam plates 87 of the step plate 99. Each slide pin 72 is at its lowermost position in the corresponding vertical slot 30 at a height $H_{13}$ from the lower surface of the frame 59 when the cam plates 87 are moved to the left limit position as shown in FIG. 27(c). Each slide pin 72 is at a position in the corresponding vertical slot 30 at a height $H_{13}$ from the lower surface of the frame 59 when the cam plates 87 are moved to the right limit position as shown in FIG. 27(d). Each slide pin 72 is at a position between the position shown in FIG. 27(c) and the position shown in FIG. 27(a) when the cam plates 87 are positioned at a position between the position shown in FIG. 27(a) and the position shown in FIG. 27(c). Thus, when the step plate 99 provided with the cam slots 89 is moved transversely, as viewed in FIGS. 27(a) to 27(d), the height of the elevator 69 from the lower surface of the frame 59 varies accordingly in a range corresponding to the length of the vertical slots 30. The frame 59, the driving mechanism 92 and the step plate 99 constitute an elevator driving mechanism for vertically moving the elevator 69.

Eleventh Embodiment

There is the possibility that the pair of cam plates 87 of the step plate 99 of the elevator driving mechanism shown in FIG. 26 tilt toward each other and interfere with the elevator 69 when the elevator 69 is raised. FIGS. 28 to 31 show means for preventing such a trouble by way of example.

Figure 28:
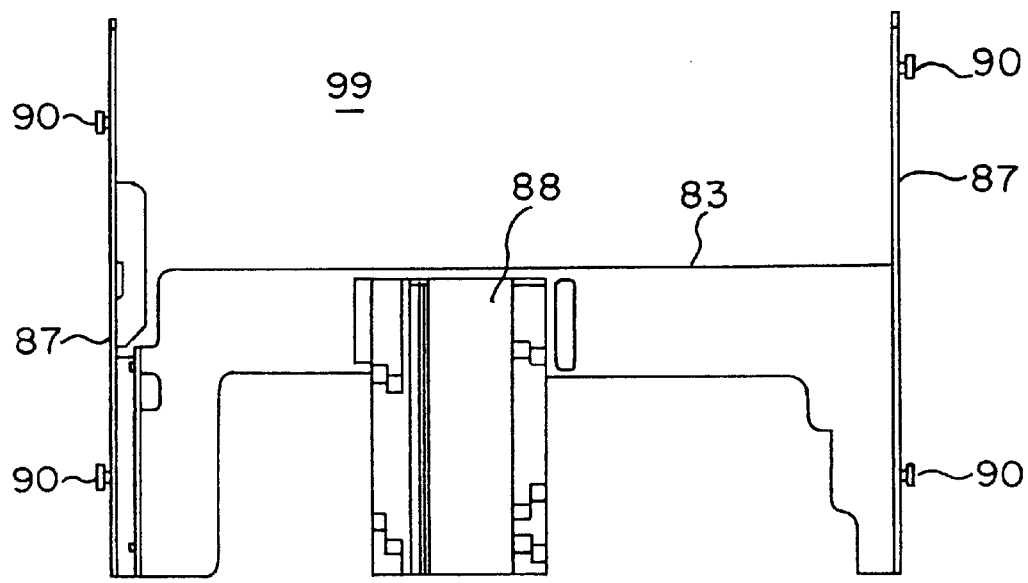
FIG. 28 is a top view of a step plate.
Figure 29:
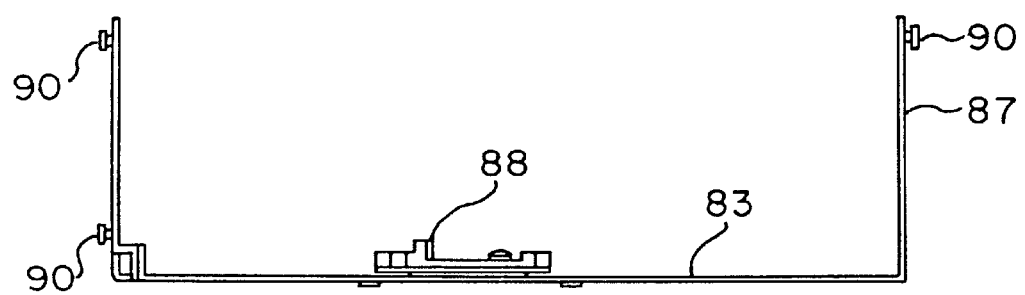
FIG. 29 is a front view of the step plate of FIG. 28.
Figure 30:
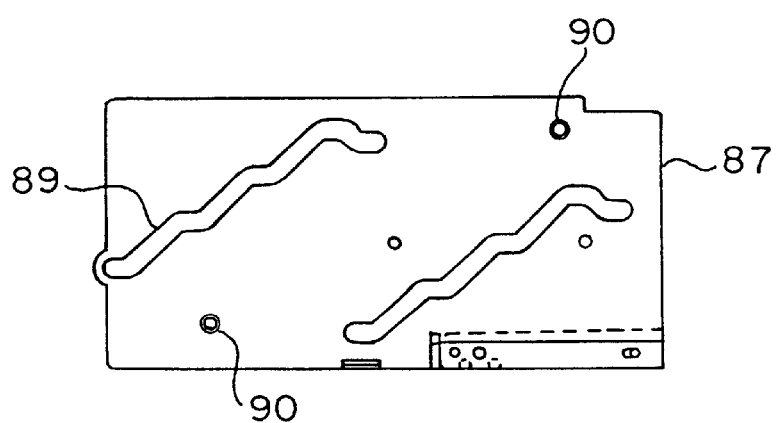
FIG. 30 is a side view of the step plate of FIG. 28.
Figure 31:
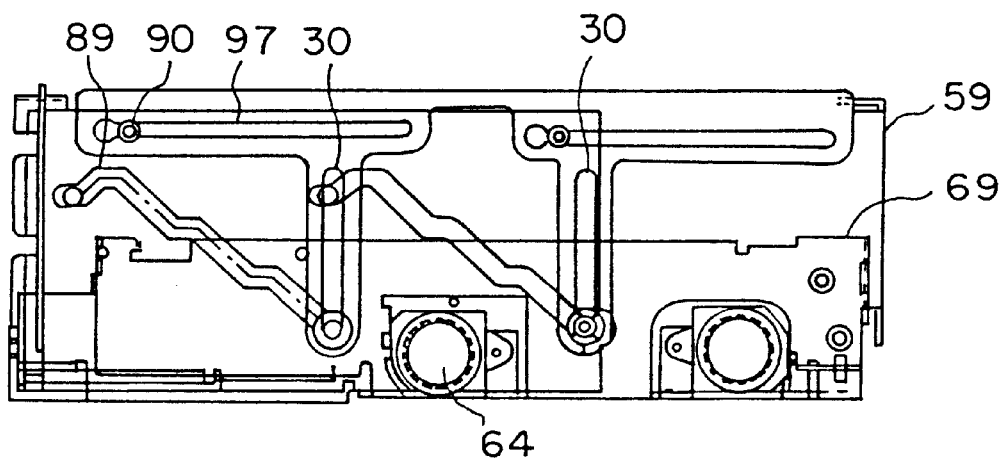
FIG. 31 is a side view of the step plate of FIG. 28 as incorporated into the cartridge holder transfer device of FIG. 25.

FIG. 28 is a top plan view of a step plate 99 employed in the eleventh embodiment, FIG. 29 is a front view of the step plate 99 of FIG. 28, FIG. 30 is a side view of the step plate of FIG. 28, and FIG. 31 is a side view of an assembly of the step plate 99 shown in FIGS. 28 to 30, and a frame 59.

Referring to FIGS. 28 to 31, guide pins 90 each having an expanded head are attached to the outer surfaces of a pair of cam plates 87, and are fitted in guide slots formed in guide slots 97 formed in the frame 59 (FIG. 31). Since the diameter of the heads of the guide pins 90 are greater than the width of the guide slots 97, the cam plates 87 are unable to separate from the frame 59 and to tilt toward each other.

Figure 32:
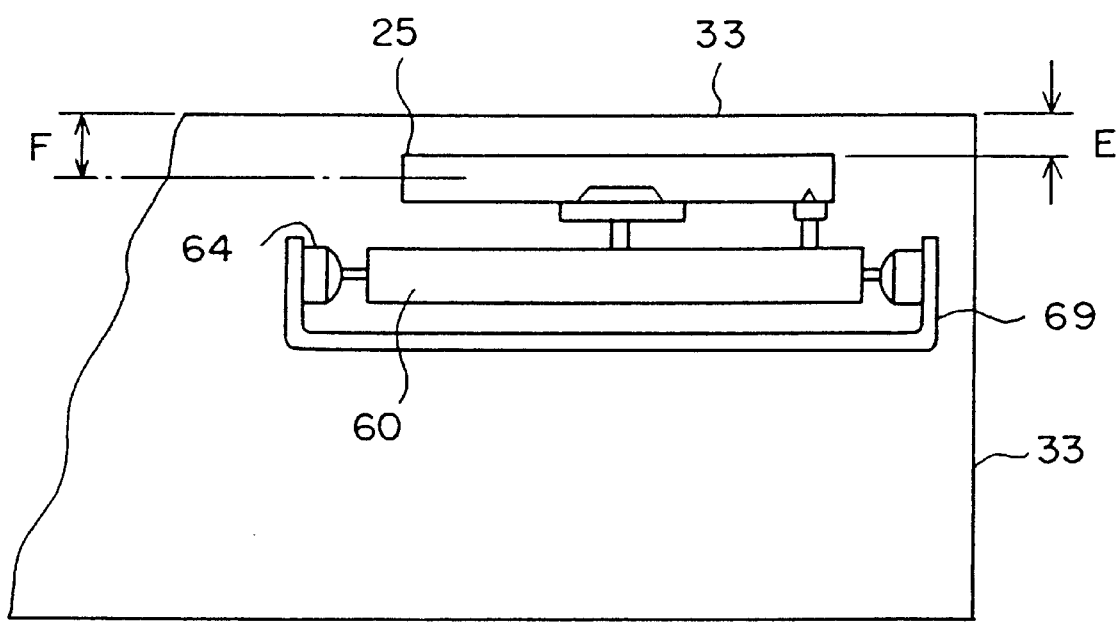
FIG. 32 is a sectional view of a case.

FIG. 32 shows the positional relation between a cartridge 25 inserted through the insertion slot 32, not shown, in the cartridge holder and mounted on the turntable 62, and the top wall of the case 33 when the elevator 69 is raised to its uppermost position (FIG. 27(a)). When the reproducing operation is executed in the state shown in FIG. 32, the floating deck 60 vibrates within a range dependent on the damping characteristics of the damping supports 64. Therefore, a space of a size E greater than the range of vibration of the floating deck 60 must be secured between the upper surface of the cartridge 25 and the top wall of the case 33. Accordingly, the center plane of the insertion slot must be at a distance F from the top wall of the case 33, which makes it difficult to form the apparatus in a comparatively small size.

When the cam plates 87 of the step plate 99 are moved further to the right, as viewed in FIG. 27(d), beyond the position shown in FIG. 27(a), the position of the slide pins 72 is lower than that of the same in the state shown in FIG. 27(a); that is, the elevator 69 moves downward when the cam plates 87 of the step plate 99 are moved to the right from the position shown in FIG. 27(a) to the position shown in FIG. 27(d), while the elevator 69 moves upward when the cam plates 87 of the step plate 99 are moved to the right from the position shown in FIG. 27(c) via a position shown in FIG. 27(b) to the position shown in FIG. 27(a). The cam plates 87 are positioned as shown in FIG. 27(a) when the cartridge 25 is mounted on the turntable 62, and then the cam plates 87 are positioned as shown in FIG. 27(d) to lower the elevator 69 for reproducing operation. When the elevator 69 is thus lowered after the cartridge 25 has been mounted on the turntable 62, a space having a sufficiently large thickness can be secured and, therefore, the size E of the space shown in FIG. 32 may be as large as the cartridge 25 can be moved and the uppermost insertion slot can be formed very near to the top wall of the case 33.

Twelfth Embodiment

Figure 33A:
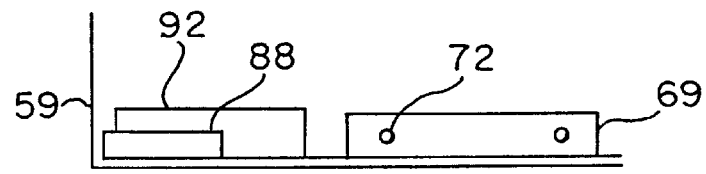
FIGS. 33(a), 33(b), 33(c) and 33(d) are diagrammatic views of assistance in explaining an elevator driving system.
Figure 33B:
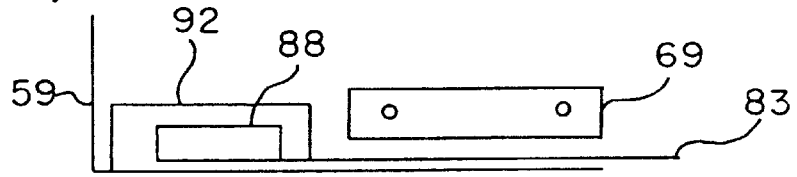
Figure 33C:
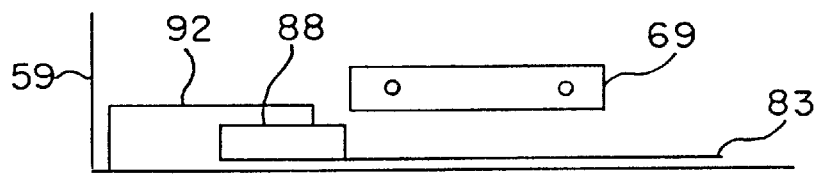
Figure 33D:
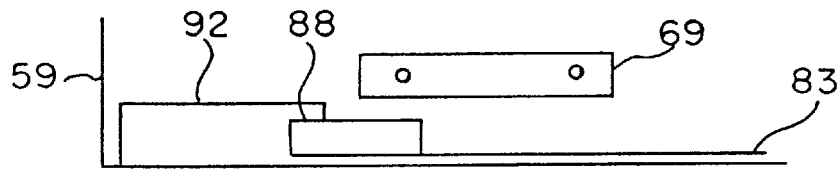

FIGS. 33(a) to 33(d) shows the positional relation between the elevator and the elevator driving mechanism. In FIG. 33(a), the elevator 69 shown in FIG. 25 is at its lowermost position.

The fourteenth aspect of the present invention will be described with reference to FIGS. 25 and 33(a) to 33(d). FIGS. 33(a) to 33(d) are sectional side views of the elevator driving mechanism shown in FIG. 25, taken on the center line of the elevator driving mechanism shown in FIG. 25. Referring to FIGS. 33(a) to 33(d) showing the position of the elevator 69 corresponding to the position of the rack 88 relative to the position of the driving mechanism 92, the driving mechanism 92 is disposed outside the path of vertical movement of the elevator 69. Therefore, the thickness of the apparatus is dependent only on the range of vertical movement of the elevator 69 and is not dependent at all on the height of the driving mechanism 92. Although the rack 88 enters the path of the vertical movement of the elevator 69 partly, the rack 88 and the elevator 69 do not interfere with each other because the rack 88 enters the path of the vertical movement of the elevator 69 after the elevator 69 has been raised to leave a space large enough to receive the rack 88 therein under the elevator 69.

Thirteenth Embodiment

Figure 34:
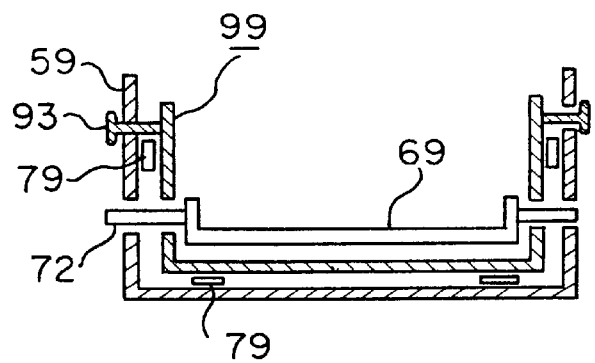
FIG. 34 is a sectional front view of a MD cartridge loading mechanism in a thirteenth embodiment according to the present invention.

FIG. 34 is a sectional front view of an elevator driving mechanism in a thirteenth embodiment according to the fifteenth aspect of the present invention, employing the step plate 99 shown in FIG. 28. As shown in FIG. 34, low-friction or damping pads 79, such as felt pads, nonwoven fabric pads, polytetrafluoroethylene pads or rubber pads, are attached to the outer surfaces of the walls of the step plate 99, the inner surfaces of the walls of the frame 59 facing the step plate 99 or the outer surfaces of the walls of the elevator 69 facing the step plate 99 to suppress the vibration of the step plate 99 and the elevator 69 in resonance with external vibrations, so that vibrational noise will not be generated.

Fourteenth Embodiment

Figure 35:
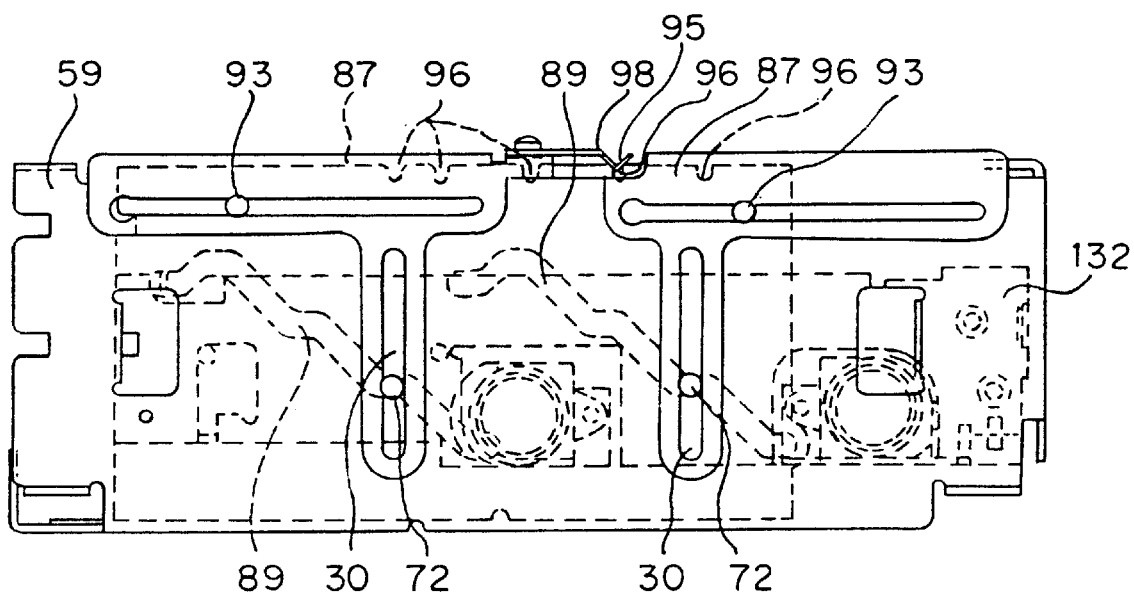
FIG. 35 is a side view of a step plate included in a MD cartridge loading mechanism in a fourteenth embodiment according to the present invention.

FIG. 35 shows an elevator driving mechanism in a fourteenth embodiment according to the seventeenth aspect of the present invention.

Since the cam slots of the step plate 99 are inclined or since the horizontal portions of the inclined cam slots having the horizontal portions to move the elevator 69 stepwise cannot have a long length, it is difficult to locate the elevator 69 correctly at the specified positions. Although the arrival of the elevator 69 at a position corresponding to the horizontal portions of the inclined cam slots is detected by a switch, not shown, it often occurs that the elevator 69 is caused to overshoot by the inertia of the driving mechanism 92 and cannot be stopped at the desired position. The embodiment shown in FIG. 35 is intended to solve such problems.

Referring to FIG. 35, a plate spring 98 having a bent free end 95 is fixed to the upper end of a frame 59, and a plurality of recesses 96 are formed in the upper edges of the cam plate of a step plate 99. The recesses 96 correspond to levels at which the elevator 69 is to be stopped, respectively. When the elevator 69 reaches a desired position the bent free end 95 of the plate spring 98 drops into the corresponding recess 96 with a click to make it difficult for the step plate 99 to move from the position corresponding to the desired position of the elevator 69.

Fifteenth Embodiment

Figure 37:
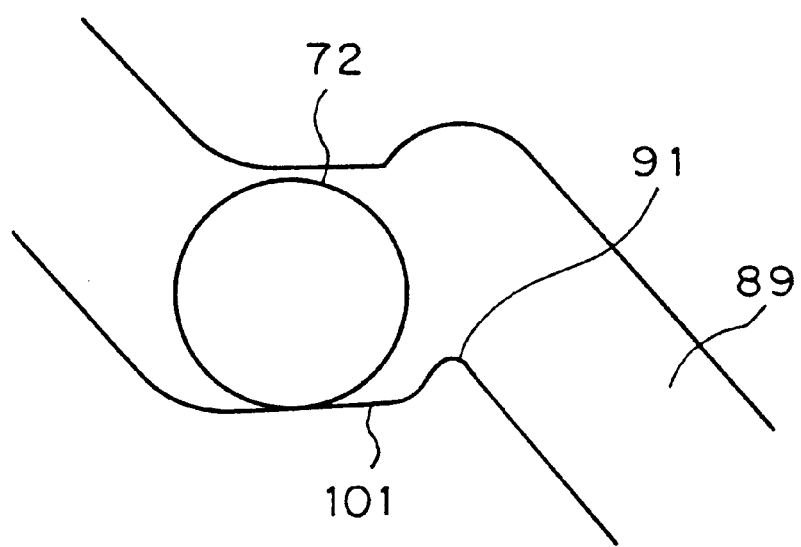
FIG. 37 is an enlarged fragmentary side view of a portion of the cam plate of FIG. 36.
Figure 36:
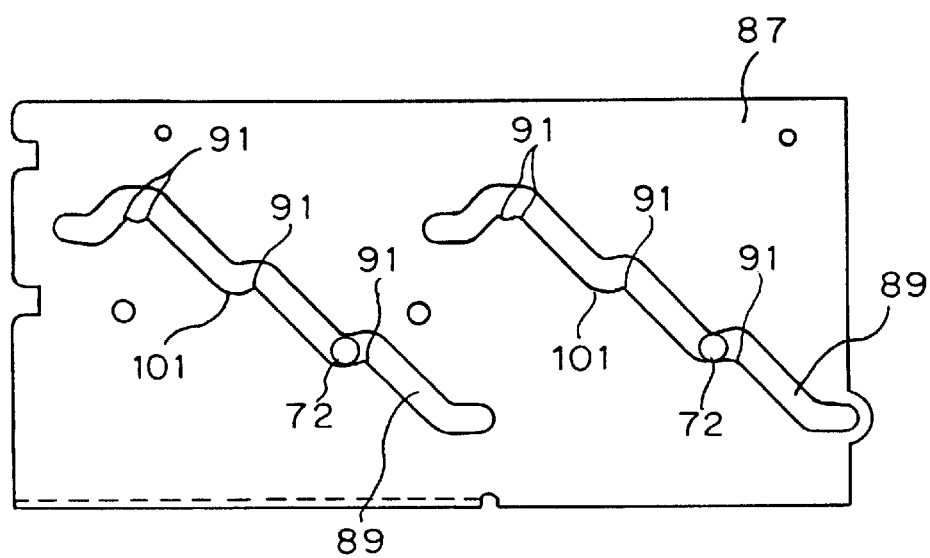
FIG. 36 is a front view of a cam plate included in a MD cartridge loading mechanism in a fifteenth embodiment according to the present invention.
Figure 38:
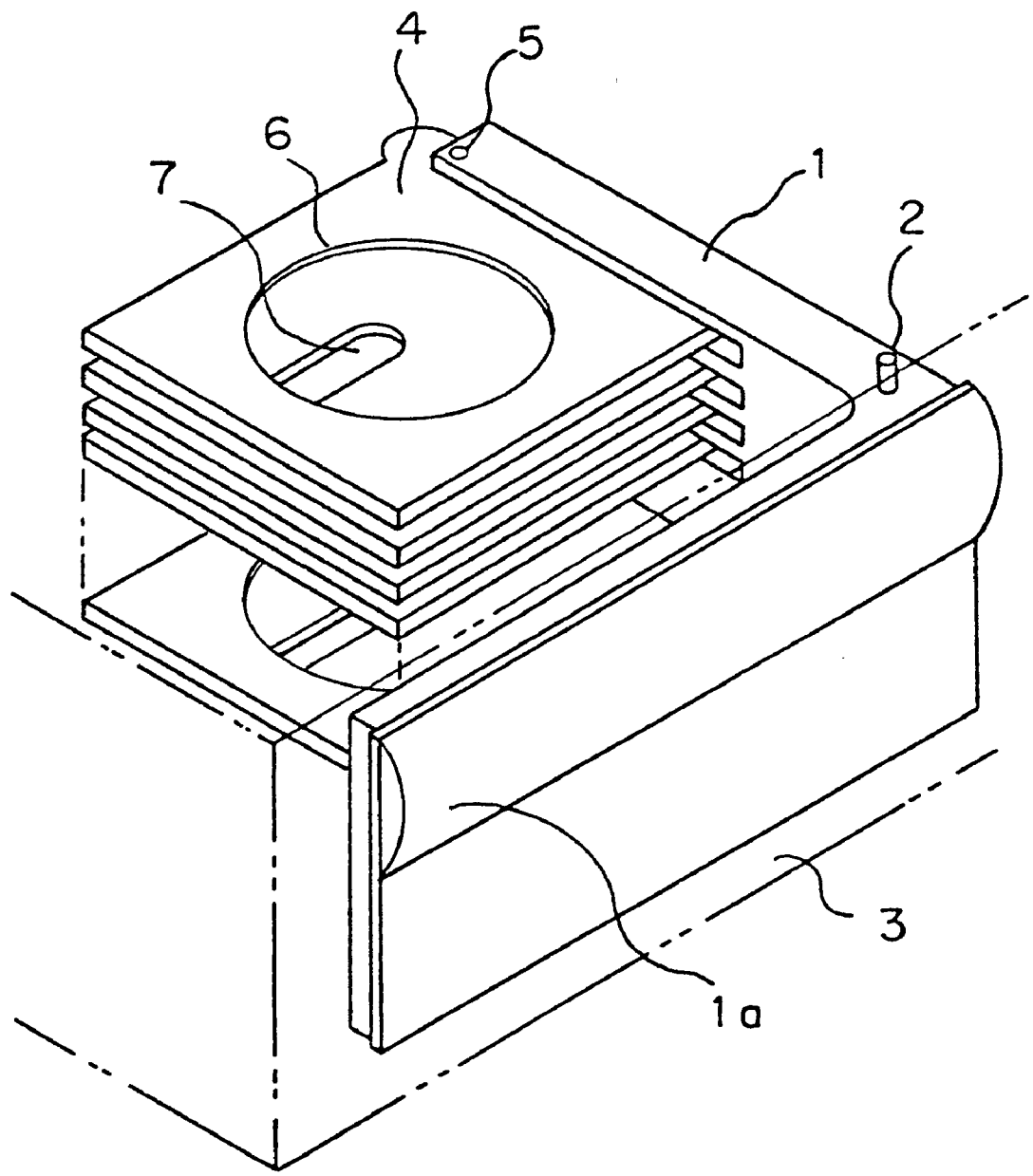
FIG. 38 is a fragmentary perspective view of a conventional multidisk loading mechanism.
Figure 39:
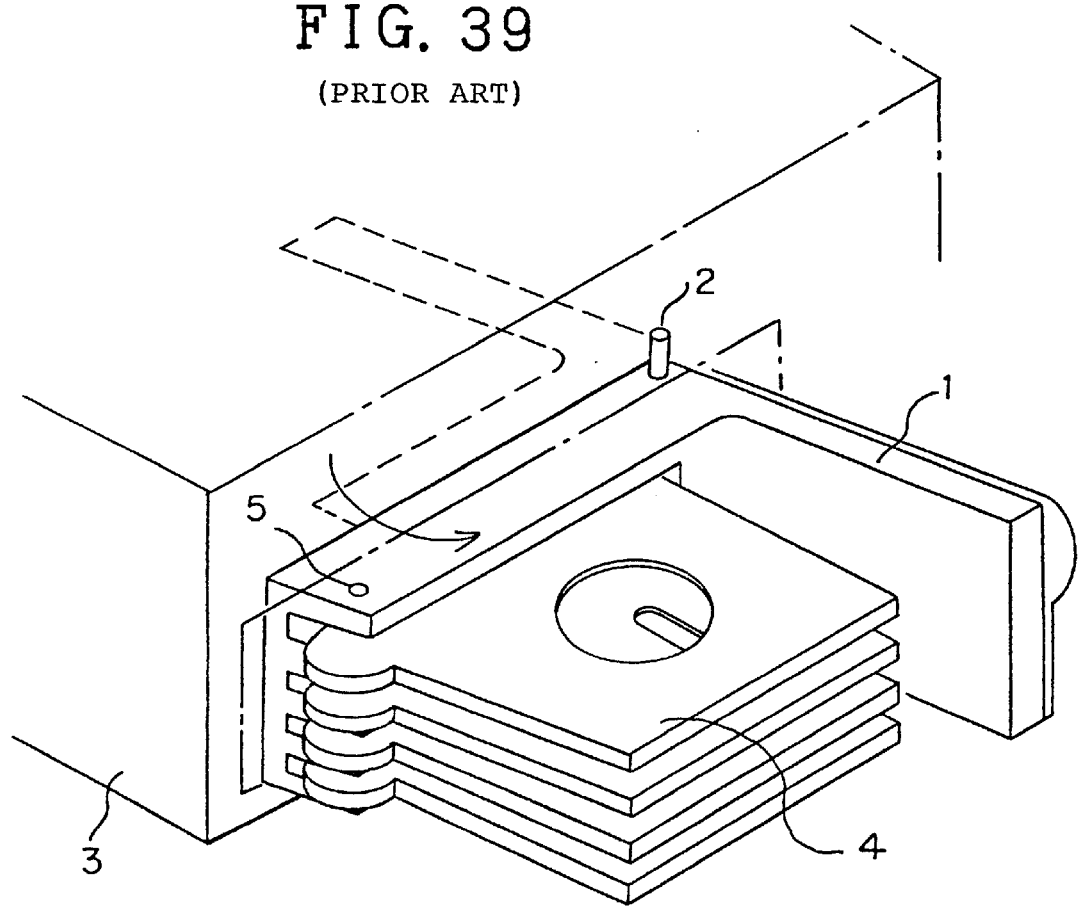
FIG. 39 is a fragmentary perspective view of the conventional multidisk loading mechanism of FIG. 38 in a state where cartridges are moved outside the multidisk loading mechanism.
Figure 40:
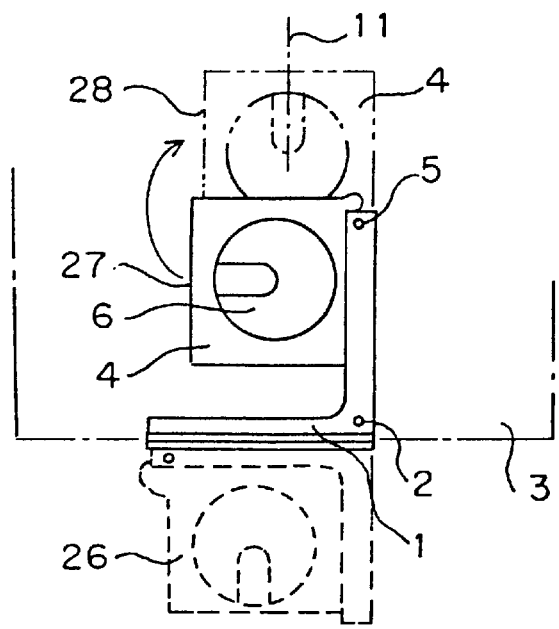
FIG. 40 is a plan view of assistance in explaining the multidisk loading mechanism of FIG. 38.

FIGS. 36 and 37 show a fifteenth embodiment according to the eighteenth aspect of the present invention intended to stop the step plate 99 at a desired position in an improved accuracy.

Referring to FIGS. 36 and 37, each cam slot 89 has a protrusion 91 on the lower edge thereof between the upper end of each of inclined portions and a horizontal portion 101 in which the slide pin 72 stays when the step plate reaches a position corresponding to a desired height of the elevator 69. The short horizontal portion 101 on the opposite sides of the stopping position where the slide pin 72 is to be stopped and hence the height of the elevator 69 will not change even if the step plate 99 moves slightly in either direction after the slide pin 72 has reached the horizontal portion 101. Since the opposite ends of the lower edge of the horizontal portion 101 are inclined upward, the slide pin 72 can stably held in the horizontal portion 101.

As is apparent from the foregoing description, the present invention has the following advantages.

The MD cartridge loading mechanism in the first to the seventh aspect of the present invention enables visual recognition of the positions of the MDs stored in the MD storage unit, enables reading titles and contents indicated on the back end surfaces of the MDs stored in the MD storage unit other than the MD loaded on the MD reproducing apparatus, enables the MDs to be taken out and changed while one of the MDs stored in the MD storage unit is loaded on the MD reproducing apparatus and the MD reproducing apparatus is in operation, does not need a MD transfer device of a very strong construction because only a single MD is transferred from the MD storage unit to the MD reproducing apparatus at a time, and can be formed in a comparatively small lightweight construction. Furthermore, since the cartridge holder is supported on its opposite sides during transfer, the cartridge holder will not tilt during transfer and the cartridge holder may be of a thin construction.

The MD loading mechanism in the sixth aspect of the present invention can be installed in either a longitudinal position or a transverse position because the sensor moves along a path inclined at an angle of 45° to a horizontal line.

Since each of the cartridge holders in the eighth aspect of the present invention has the shape of a U-shaped frame and is not provided with neither a top wall or a bottom wall, the height of a stack of the cartridge holders is small as compared with that of a stack of the same number of conventional cartridge holders having the shape of a case.

The MD loading mechanism in the ninth and the tenth aspect of the present invention has an advantage of facilitating the insertion of cartridges in the cartridge holders in addition to those of the first to the sixth aspect of the present invention.

Since the floating deck of the cartridge holder transfer device in the twelfth aspect of the present invention is retracted from its operating position to a loading position so as to form a space between the upper surface of the turntable and the cartridge being transferred to a position directly above the turntable and is locked at the loading position while the cartridge is being moved to the position directly above the turntable, the cartridge need not be transferred in a raised plane extending above a plane including the upper surface of the turntable when the floating deck is located at the operating position, so that the cartridge holder transfer device can be formed in a reduced size.

Since the cartridge holder transfer device in the thirteenth aspect of the present invention is provided with the elevator releasing means that moves the floating deck further inward and releases the locked floating deck after the top cartridge at the top of the stack of cartridges has been transferred to and mounted on the turntable, any marginal space need not be formed over the top cartridge, so that the cartridge holder transfer device can be formed in a comparatively small size.

Since the elevator driving mechanism of the cartridge holder transfer device in the fourteenth aspect of the present invention is disposed outside the path of the elevator that moves vertically, the height of the cartridge holder transfer device is dependent only on the range of vertical movement of the elevator, so that the cartridge holder transfer device can be formed in a comparatively small size.

Since the cartridge holder transfer device in the fifteenth aspect of the present invention is provided with the low-friction or damping pads attached to part or entire area of the surfaces of the walls of the step plate facing the frame or the elevator, the step plate and the elevator are able to move smoothly without generating vibrational noise.

Since the step plate of the cartridge transfer device in the sixteenth aspect of the present invention is provided with the recesses, and the projection or the spring plate fixed to the frame engages each of the recess to stop the step plate correctly at a position corresponding to the recess, so that the step plate can be stopped at the desired position corresponding to the recess engaging the projection or the spring plate in an improved accuracy.

The step plate of the cartridge holder transfer device in the seventeenth aspect of the present invention is provided, as the elevator releasing means in the thirteenth aspect of the present invention, with the step plate provided with cam slots each having portions having a triangular cam surface to move the elevator slightly downward in raising the elevator, and can be formed in a simple construction and in a comparatively small size.

Each of the cam slots of the step plate in the eighteenth aspect of the present invention has horizontal portions respectively corresponding to the desired levels of the elevator and the opposite ends of each horizontal portion are inclined upward, so that the slide pin of the elevator can be retained in the horizontal portion regardless of the slight movement of the step plate and hence the elevator can be stopped on the desired level in an improved accuracy.

While the preferred embodiments of the invention have been described using specific terms, such description is for illustrative purposes only, and it is to be understood that changes and variations may be made without departing from the spirit or scope of the invention defined by the following claims.

What is claimed is:

1. A MD loading mechanism for storing a plurality of MD cartridges and loading one of said plurality of cartridges in a MD reproducing apparatus for reproducing information recorded on the MDs of the MD cartridges, said MD loading mechanism comprising:

a plurality of cartridge holders for holding MD cartridges therein, respectively, said plurality of cartridge holders each provided with at least one grip pin which is gripped when transferring the cartridge holder, each cartridge holder including, an eject plate movable between a locking position, in which the MD cartridge is fully received in said cartridge holder, and an ejecting position, in which the MD cartridge is at least partially ejected from said cartridge holder, an eject lever unlocking said eject plate from said locking position to move said eject plate from said locking position to said ejecting position such that the MD cartridge can be removed from said cartridge holder by a user, and a loading hook pivotally supported by said eject plate, said loading hook engaging with the MD cartridge to lock the MD cartridge with respect to said eject plate when said eject plate is in said locking position and maintaining engagement even after said eject plate is moved to said eject position by an operation of said eject lever;

a MD cartridge storage unit for storing the plurality of cartridge holders therein in a stack so that back end surfaces of the MD cartridges held within the cartridge holders can be seen from outside, said MD cartridge storage unit provided with a plurality of insertion slots through which the MD cartridges are inserted in the cartridge holders held behind the insertion slots within the MD cartridge storage unit and cartridge holder locking means for locking the cartridge holders in place within the MD cartridge storage unit;

a cartridge holder transfer means for transferring the cartridge holder holding said one of said plurality of cartridges in a plane substantially parallel to the surface of the MD cartridge held in the cartridge holder in the MD cartridge storage unit from the MD cartridge storage unit to the MD reproducing apparatus by gripping said at least one grip pin of the cartridge holder; and an elevator means for moving vertically said MD reproducing apparatus and said cartridge holder transfer means so that said MD reproducing apparatus and said cartridge holder transfer means are positioned at heights corresponding to a height of the holder holding said one of said plurality of cartridges.

2. A MD loading mechanism of claim 1, wherein said cartridge holder further includes,
   a locking mechanism locking said eject plate in said locking position when said MD cartridge is being fully inserted in said cartridge holder.

3. A MD loading mechanism for storing a plurality of MD cartridges and loading one of said plurality of cartridges in a MD reproducing apparatus for reproducing information recorded on the MDs of the MD cartridges, said MD loading mechanism comprising:
   a plurality of cartridge holders for holding MD cartridges therein, respectively, said plurality of cartridge holders each provided on the opposite sides thereof with at least one grip pin which is gripped when transferring the cartridge holder, each cartridge holder including,
      an eject plate movable between a locking position, in which the MD cartridge is fully received in said cartridge holder, and an ejecting position, in which the MD cartridge is at least partially ejected from said cartridge holder,
      an eject lever unlocking said eject plate from said locking position to move said eject plate from said locking position to said ejecting position such that the MD cartridge can be removed from said cartridge holder by a user, and
      a loading hook pivotally supported by said eject plate, said loading hook engaging with the MD cartridge to lock the MD cartridge with respect to said eject plate when said eject plate is in said locking position and maintaining engagement even after said eject plate is moved to said eject position by an operation of said eject lever;
   a MD cartridge storage unit for storing the plurality of cartridge holders therein in a stack so that back end surfaces of the MD cartridges held within the cartridge holders can be seen from outside, said MD cartridge storage unit provided with a plurality of insertion slots through which the MD cartridges are inserted in the cartridge holders held behind the insertion slots within the MD cartridge storage unit and cartridge holder locking means for locking the cartridge holders within the MD cartridge storage unit;
   a linear cartridge holder transfer means for transferring the cartridge holder holding said one of said plurality of cartridges in a plane substantially parallel to the surface of the MD cartridge held in the cartridge holder in the MD cartridge storage unit from the MD cartridge storage unit to the MD reproducing apparatus along a direction parallel to a direction in which the MD cartridges are inserted through the insertion slots in the cartridge holders, respectively, by gripping said at least one grip pin of the cartridge holder; and
   an elevator means for moving vertically said MD reproducing apparatus and said linear cartridge holder transfer means so that said MD reproducing apparatus and said linear cartridge holder transfer means are positioned at heights corresponding to a height of the holder holding said one of said plurality of cartridges.

4. A MD loading mechanism for storing a plurality of MD cartridges and loading one of said plurality of cartridges in a MD reproducing apparatus for reproducing information recorded on the MDs of the MD cartridges, said MD loading mechanism comprising:
   a plurality of cartridge holders for holding MD cartridges therein, respectively, said plurality of cartridge holders each provided on the opposite sides thereof with at least one grip pin which is gripped when transferring the cartridge holder, each cartridge holder including,
      an eject plate movable between a locking position, in which the MD cartridge is fully received in said cartridge holder, and an ejecting position, in which the MD cartridge is at least partially ejected from said cartridge holder,
      an eject lever unlocking said eject plate from said locking position to move said eject plate from said locking position to said ejecting position such that the MD cartridge can be removed from said cartridge holder by a user, and
      a loading hook pivotally supported by said eject plate, said loading hook engaging with the MD cartridge to lock the MD cartridge with respect to said eject plate when said eject plate is in said locking position and maintaining engagement even after said eject plate is moved to said eject position by an operation of said eject lever;
   a MD cartridge storage unit for storing the plurality of cartridge holders therein in a stack so that back end surfaces of the MD cartridges held within the cartridge holders can be seen from outside, said MD cartridge storage unit provided with a plurality of insertion slots through which the MD cartridges are inserted in the cartridge holders held behind the insertion slots within the MD cartridge storage unit and cartridge holder locking means for locking the cartridge holders within the MD cartridge storage unit;
   an orthogonal cartridge holder transfer means for transferring the cartridge holder holding said one of said plurality of cartridges in a plane substantially parallel to the surface of the MD cartridge held in the cartridge holder in the MD cartridge storage unit from the MD cartridge storage unit to the MD reproducing apparatus along a direction perpendicular to a direction in which the MD cartridges are inserted through the insertion slots in the cartridge holders, respectively, by gripping said at least one grip pin of the cartridge holder; and
   an elevator means for moving vertically said MD reproducing apparatus and said orthogonal cartridge holder transfer means so that said MD reproducing apparatus and said orthogonal cartridge holder transfer means are positioned at heights corresponding to a height of the holder holding said one of said plurality of cartridges.

5. A MD loading mechanism for storing a plurality of MD cartridges and loading one of said plurality of cartridges in a MD reproducing apparatus for reproducing information recorded on the MDs of the MD cartridges, said MD loading mechanism comprising;
   a plurality of cartridge holders for holding MD cartridges therein, respectively, said plurality of cartridge holders each provided in one corner thereof with a pivot and in another corner thereof with a grip pin which is gripped when transferring the cartridge holder, each cartridge holder including,
      an eject plate movable between a locking position, in which the MD cartridge is fully received in said cartridge holder, and an ejecting position, in which the MD cartridge is at least partially ejected from said cartridge holder,
      an eject lever unlocking said eject plate from said locking position to move said eject plate from said locking position to said ejecting position such that the MD cartridge can be removed from said cartridge holder by a user, and a loading hook pivotally supported by said eject plate, said loading hook engaging with the MD cartridge to lock the MD cartridge with respect to said eject plate when said eject plate is in said locking position and maintaining engagement even after said eject plate is moved to said eject position by an operation of said eject lever;

a MD cartridge storage unit for storing the plurality of cartridge holders therein in a stack so that back end surfaces of the MD cartridges held within the cartridge holders can be seen from outside and so that the cartridge holders can be turned on their pivots, said MD cartridge storage unit provided with a plurality of insertion slots through which the MD cartridges are inserted in the cartridge holders held behind the insertion slots within the MD cartridge storage unit and cartridge holder locking means for locking the cartridge holders within the MD cartridge storage unit;

a circular cartridge holder transfer means for transferring the cartridge holder holding said one of said plurality of cartridges in a plane substantially parallel to the surface of the MD cartridge held in the cartridge holder in the MD cartridge storage unit from the MD cartridge storage unit to the MD reproducing apparatus by gripping the grip pin of the cartridge holder and turning the cartridge holder on its pivot; and an elevator means for moving vertically said MD reproducing apparatus and said circular cartridge holder transfer means so that said MD reproducing apparatus and said circular cartridge holder transfer means are positioned at heights corresponding to a height of the holder holding said one of said plurality of cartridges.

6. A MD loading mechanism for storing a plurality of MD cartridges and loading one of said plurality of cartridges in a MD reproducing apparatus for reproducing information recorded on the MDs of the MD cartridges, said MD loading mechanism comprising:

a plurality of cartridge holders for holding MD cartridges therein, respectively, said plurality of cartridge holders each provided in one corner thereof with a pivot and in another corner with a grip pin which is gripped when transferring the cartridge holder, each cartridge holder including, an eject plate movable between a locking position, in which the MD cartridge is fully received in said cartridge holder, and an ejecting position, in which the MD cartridge is at least partially ejected from said cartridge holder, an eject lever unlocking said eject plate from said locking position to move said eject plate from said locking position to said ejecting position such that the MD cartridge can be removed from said cartridge holder by a user, and a loading hook pivotally supported by said eject plate, said loading hook engaging with the MD cartridge to lock the MD cartridge with respect to said eject plate when said eject plate is in said locking position and maintaining engagement even after said eject plate is moved to said eject position by an operation of said eject lever;

a MD cartridge storage unit for storing the plurality of cartridge holders therein in a stack so that back end surfaces of the MD cartridges held within the cartridge holders can be seen from outside and so that the cartridge holders can be turned on their pivots, said MD cartridge storage unit provided with a plurality of insertion slots through which the MD cartridges are inserted in the cartridge holders held behind the insertion slots within the MD cartridge storage unit and cartridge holder locking means for locking the cartridge holders within the MD cartridge storage unit;

an oblique circular cartridge holder transfer means for transferring the cartridge holder holding said one of said plurality of cartridges in a plane substantially parallel to the surface of the MD cartridge held in the cartridge holder in the MD cartridge storage unit from MD cartridge storage unit to the MD reproducing apparatus by gripping the grip pin of the cartridge holder and turning the cartridge holder on its pivot through an angle of 45°, 135°, 225° or 315° from a storage position to a reproducing position; and an elevator means for moving vertically said MD reproducing apparatus and said circular cartridge holder transfer means so that said MD reproducing apparatus and said circular cartridge holder transfer means are positioned at a height corresponding to that of the holder holding said one of said plurality of cartridges.

7. A MD loading mechanism according to any one of claims 1, 2, 4, and 6, wherein each of the cartridge holders is a U-shaped frame provided at least at two positions on the inner side thereof with lugs that engage grooves formed in the MD cartridge to hold the MD cartridge without using any top wall and any bottom wall so that the cartridge holders can be stacked in a height smaller than that in which the same number of cartridge holders having the shape of a case are stacked.

8. A MD loading mechanism according to any one of claims 1, 2, 4, 6 and 7, further comprising a guide panel provided with insertion slots demarcated by slats and having dimensions capable of guiding the MD cartridge in a correct position and in a correct direction, and connected to the MD cartridge storage unit with the insertion slots in alignment with those of the MD cartridge storage unit, respectively, so that the back end surfaces of the MD cartridges inserted in the cartridge holders can be seen from outside.

9. A MD loading mechanism according to any one of claims 1, 2, 4, 6 and 7, further comprising a guide panel provided with insertion slots demarcated by slats provided with recesses, respectively, and having dimensions capable of guiding the MD cartridges in a correct position and in a correct direction, and connected to the MD cartridge storage unit with the insertion slots in alignment with those of the MD cartridge storage unit, respectively, so that the back end surfaces of the MD cartridges inserted in the cartridge holders can be seen from outside and flush with the bottom surfaces of the recesses of the slats.

10. A MD cartridge loading mechanism according to any one of claims 1, 2, 4, 6 and 7, wherein each of the cartridge holders is a box-shaped case having a MD cartridge inlet, capable of storing a MD cartridge therein so that the back end surface of the MD cartridge is exposed, and having a plate covering the side surfaces and part of the surface of the MD cartridge so that the MD cartridge is held in a specified position, at least one loading hook supported on the plate so as to engage a recess formed in the MD cartridge to hold the MD cartridge in place, an ejecting plate for ejecting the MD cartridge from the cartridge holder, an eject lever for operating the eject plate, and a door for covering the MD cartridge inlet.

* * * * *